(12) United States Patent
Ramprashad et al.

(10) Patent No.: US 9,516,409 B1
(45) Date of Patent: Dec. 6, 2016

(54) ECHO CANCELLATION AND CONTROL FOR MICROPHONE BEAM PATTERNS

(71) Applicant: Apple Inc., Cupertino, CA (US)

(72) Inventors: Sean A. Ramprashad, Los Altos, CA (US); Martin E. Johnson, Los Gatos, CA (US); Vasu Iyengar, Pleasanton, CA (US); Ronald N. Isaac, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 20 days.

(21) Appl. No.: 14/714,023

(22) Filed: May 15, 2015

Related U.S. Application Data

(60) Provisional application No. 62/000,328, filed on May 19, 2014.

(51) Int. Cl.
*H04B 3/20* (2006.01)
*H04R 3/00* (2006.01)
*H04R 1/08* (2006.01)
*H04B 3/23* (2006.01)

(52) U.S. Cl.
CPC ............... *H04R 3/002* (2013.01); *H04B 3/23* (2013.01); *H04R 1/08* (2013.01)

(58) Field of Classification Search
None
See application file for complete search history.

(56) References Cited

U.S. PATENT DOCUMENTS

| | | | |
|---|---|---|---|
| 7,035,415 B2 | 4/2006 | Belt et al. | |
| 7,359,504 B1* | 4/2008 | Reuss | H04M 9/082 |
| | | | 379/406.01 |
| 2009/0089053 A1 | 4/2009 | Wang et al. | |
| 2012/0114128 A1 | 5/2012 | Derkx | |
| 2013/0039504 A1 | 2/2013 | Pandey et al. | |
| 2013/0129100 A1* | 5/2013 | Sorensen | H04R 3/005 |
| | | | 381/66 |
| 2014/0274218 A1 | 9/2014 | Kadiwala et al. | |
| 2014/0286497 A1* | 9/2014 | Thyssen | H04R 3/005 |
| | | | 381/66 |
| 2015/0215700 A1* | 7/2015 | Sun | G10L 21/0232 |
| | | | 381/94.2 |

* cited by examiner

*Primary Examiner* — Muhammad N Edun
(74) *Attorney, Agent, or Firm* — Blakely, Sokoloff, Taylor & Zafman LLP

(57) ABSTRACT

Systems and methods for controlling echo in audio communications between a near-end system and a far-end system are described. The system and method may intelligently assign a plurality of microphone beams to a limited number of echo cancellers for processing. The microphone beams may be classified based on generated statistics to determine beams of interest (e.g., beams with a high ratio of local-voice to echo). Based on this ranking/classification of microphone beams, beams of greater interest may be assigned to echo cancellers while less important beams may temporally remain unprocessed until these beams become of higher importance/interest. Accordingly, a limited number of echo cancellers may be used to intelligently process a larger number of microphone beams based on interest in the beams and properties of echo cancellation performed for each beam.

20 Claims, 20 Drawing Sheets

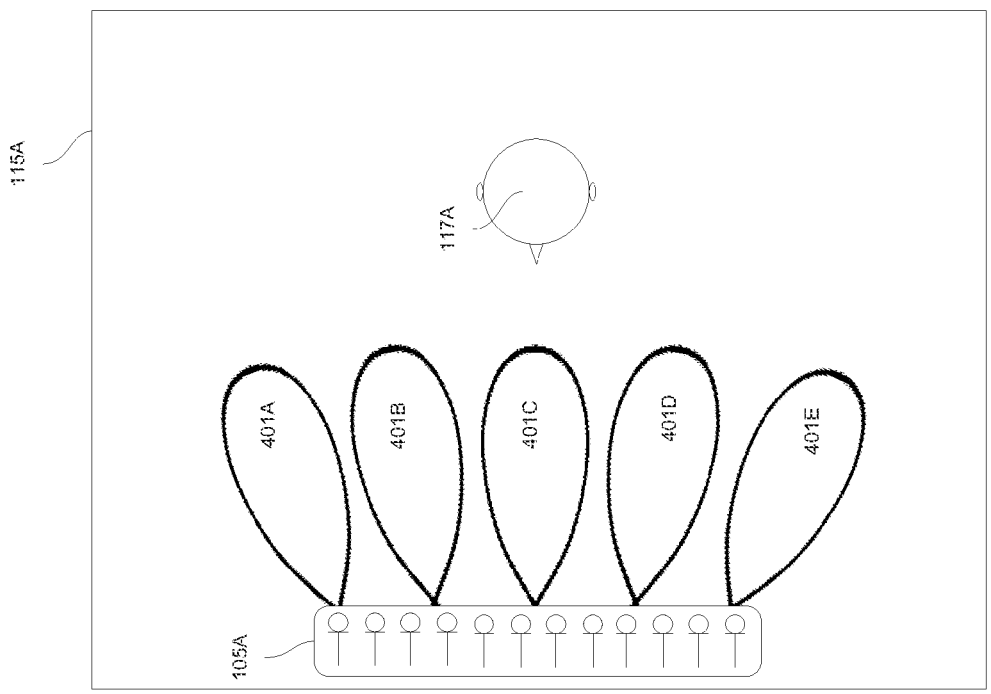

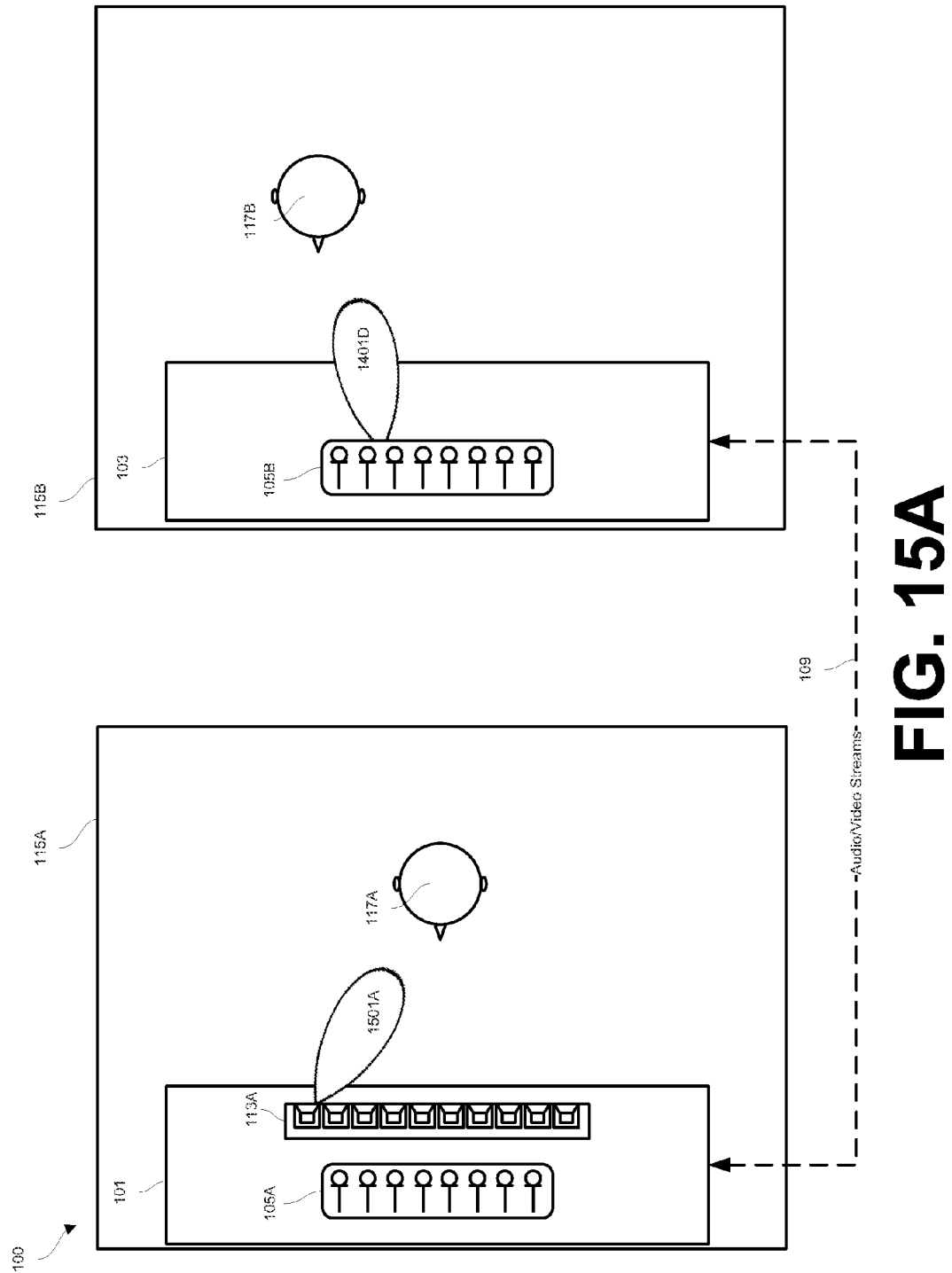

ECHO CANCELLATION AND CONTROL FOR MICROPHONE BEAM PATTERNS

RELATED MATTERS

This application claims the benefit of the earlier filing date of U.S. Application No. 62/000,328 filed May 19, 2014.

FIELD

A system and method of echo cancellation and control for microphone beam patterns is described. Other embodiments are also described.

BACKGROUND

Communication systems have become more sophisticated and advanced over the past several decades. For example, many traditional communication devices utilized only one or two microphones to sense sound from a near-end user. Although these more basic systems produced echo caused by the pickup of sound from a far-end user played through a near-end speaker, this echo could be efficiently controlled through the use of a dedicated echo canceller assigned to each microphone.

As communication systems have advanced, the number of microphones associated with these systems has increased. For example, microphone arrays, which are composed of multiple individual microphones, may be used for detecting sound in the vicinity surrounding a modern communication device. Similar to traditional systems, signals produced by each microphone in these modern devices may require processing to remove echo associated with audio playback of far-end sounds. However, due to the number of microphones in these systems, dedicated echo cancellation for each microphone may be unwieldy and/or impractical.

Further, many modern systems may require stereo echo cancellers to handle the imaging of correlated sounds through multiple speakers. Such echo cancellers can be even more complex than their monophonic counterparts given the need to handle multiple reference signals. This further constrains the number of echo cancellers that can be run at one time. In addition, stereo echo cancellation may lead to non-unique solutions which depend on a far-end sound source's position. Although de-correlation techniques may be used to assist in stereo echo cancellation, these de-correlation techniques may introduce artifacts into the signals. Further, even with the utilization of de-correlation techniques, and beyond handling multiple reference signals, more complex adaptation methods such as recursive least-squares (RLS) processes may still be needed to obtain faster convergence times by associated echo cancellers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Systems and methods for controlling echo in audio communications between a near-end system and a far-end system are described. In one embodiment, the near-end system may generate a plurality of microphone beams based on 1) sound produced by a near-end user and 2) sound originating at the far-end system and played back by one or more near-end speakers. The plurality of microphone beams may be intelligently assigned to a limited number of echo cancellers for processing. For example, the microphone beams may be classified based on generated statistics to determine beams of interest. One such set of statistics is related to echo statistics (e.g., beams with a high ratio of local-voice to echo) on information from echo cancellers. Other statistics may describe the relationship of a beam to a beam known to be important (e.g., relationship of the direction of the beams' main lobes). Based on this ranking/classification of microphone beams, beams of greater interest may be assigned to echo cancellers run in their full modes with full resources, while less important beams may be assigned to echo cancellers run in partial operation sufficient to produce echo statistics and maintain some minimal echo path tracking, while even less important beams may temporally remain unassigned to echo-cancellers and unprocessed until these beams become of higher importance/interest. Accordingly, a limited number of echo cancellers may be used to intelligently process a larger number of microphone beams based on interest in the beams and properties of echo cancellation performed for each beam.

In another embodiment, the final selection of which beams to send uplink may be based in part on the generated statistics (e.g. local-voice to echo ratios) and the states (e.g., convergence state or speed of change of echo-path states) of the echo cancellers. This may ensure that beams sent to the uplink have appropriate conditions of echo and local signal levels.

In another embodiment, the near-end system may intelligently produce speaker beams to reduce the amount of echo detected by one or more microphones while maintaining or maximizing the sound level for a user. For example, a main beam may be generated along with a test beam. The main beam may be driven with an audio signal intended to be heard by a user (e.g., a musical composition or the track of a movie) while the test beam may be driven with a test signal not intended to be perceived/detected by the user (e.g., pseudo-random orthogonal signals). The test beam may also use, in part or fully, the intended signal. When the test beam is determined to produce less echo in one or more microphones signals, the test beam may be used in place of the main beam to play an audio signal intended to be heard by a user. Although described above as separate beams generated and produced simultaneously, in other embodiments, a single beam that varies over time may be utilized to control echo.

In another embodiment, data describing a microphone beam used by the far-end system may be transmitted along with corresponding microphone signals for the far-end microphone beam to the near-end system. Based on the selected far-end microphone beam used by the far-end system, the near-end system may select 1) an appropriate speaker beam to output the far-end microphone signals and 2) a pre-computed impulse response. The selected impulse response represents the echo path between the near-end microphone beam and the corresponding speaker beam that is selected to be used by the near-end system based on the far-end microphone beam used by the far-end system. By imaging far-end sounds using a single speaker beam based on a microphone beam used by the far-end system, monophonic echo cancellation may be used in place of stereo echo cancellation. Use of monophonic echo cancellation reduces echo cancellation complexity and potential distortions.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 4A shows various beam patterns that cover various areas of a location relative to a single user according to one embodiment.

FIG. 15A shows a microphone beam produced by a far-end system and a speaker beam produced by a near-end system in response to the far-end microphone beam according to one embodiment.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
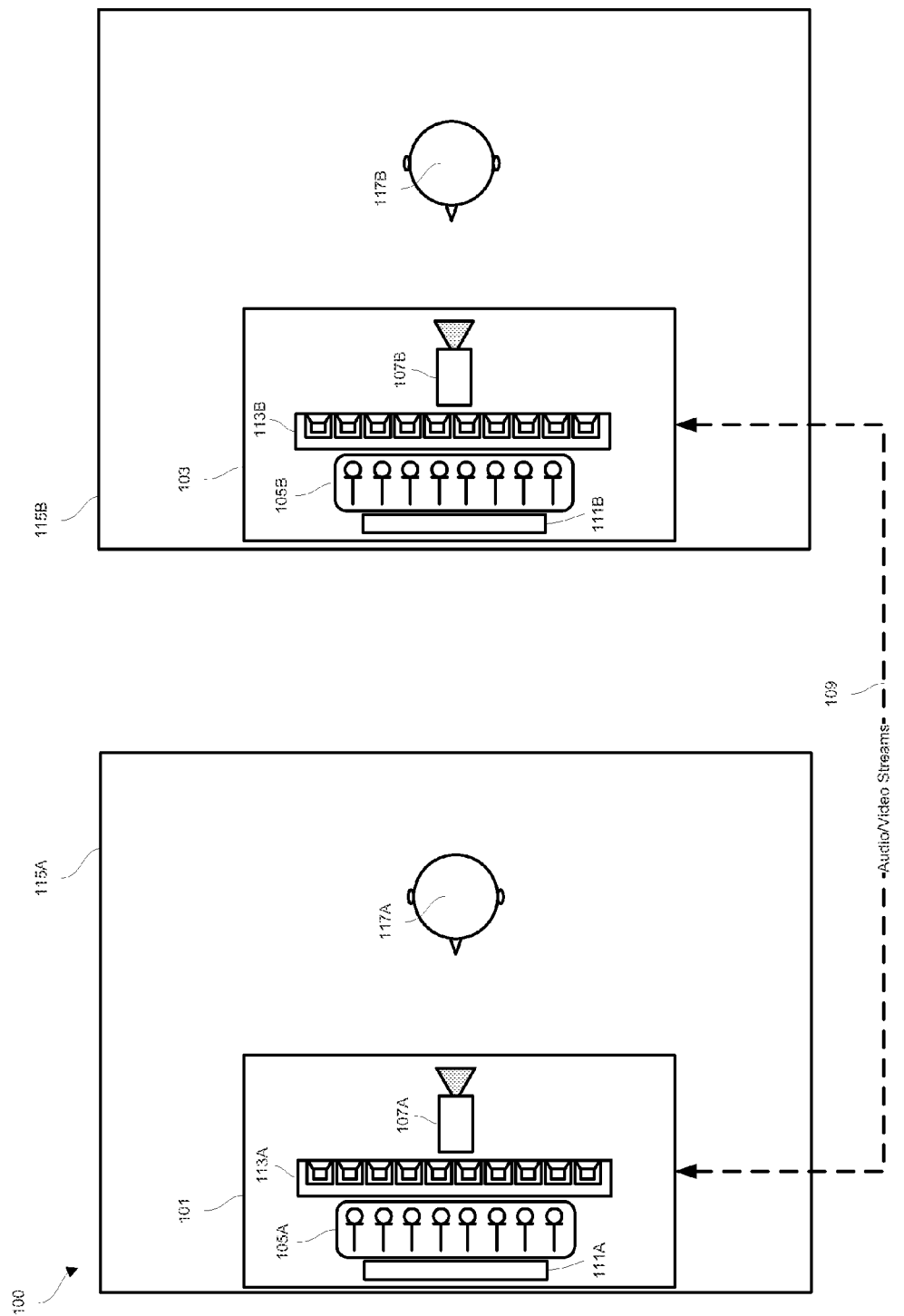
FIG. 1 shows a conference system that transfers audio and/or video signals/streams between a near-end computing system and a far-end computing system according to one embodiment.

FIG. 1 shows a conference system 100 that transfers audio and/or video signals/streams between a near-end computing system 101 and a far-end computing system 103. The audio and video streams may be captured by each of the near-end and far-end computing systems 101 and 103 using associated microphone arrays 105A and 105B and video cameras 107A and 107B. The conference system 100 may synchronously or asynchronously transfer audio and video signals/streams between the near-end and far-end systems 101 and 103 over the data connection 109 such that each of these signals/streams may be played through corresponding monitors 111A/111B and speakers 113A/113B. In some embodiments, the conference system 100 may only capture and transmit audio. In these embodiments, the near-end and far-end systems 101 and 103 may not include the video cameras 107A and 107B and/or monitors 111A and 111B, respectively. Each element of the conference system 100 will be described by way of example below. In some embodiments, the conference system 100 may include more elements than those shown and described.

As shown in FIG. 1, the near-end system 101 may be located at a first location 115A and the far-end system 103 may be located at a second location 115B. For example, the first location 115A may be a business conference room being utilized by the near-end user 117A and the second location 115B may be a business conference room being utilized by the far-end user 117B. However, in some embodiments, the first location 115A and/or the second location 115B may be outdoor areas. The first and second locations 115A and 115B may be separated by any distance (e.g., 500 feet or 500 miles) and the near-end system 101 and the far-end system 103 may communicate with each other using the data connection 109.

The data connection 109 may be any combination of wired and wireless mediums operating in a distributed or a point-to-point network. For example, the data connection 109 may utilize a combination of wired and wireless protocols and standards, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards.

Figure 2:
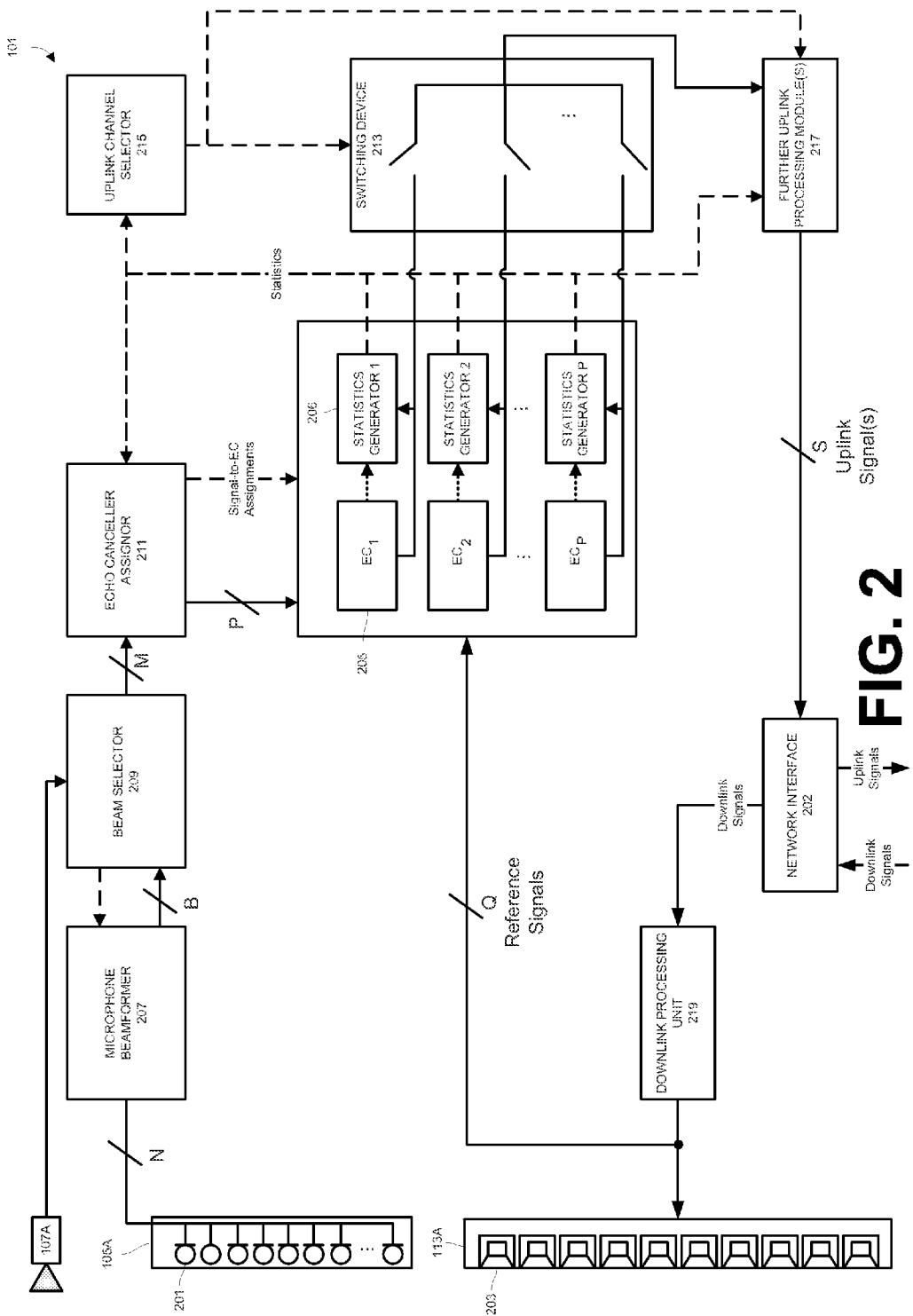
FIG. 2 shows a component diagram of the near-end system comprising an uplink processing chain including echo cancellers and a downlink playback chain according to one embodiment.

FIG. 2 shows a component diagram of the near-end system 101 according to one embodiment. In one embodiment, the near-end system 101 may be any computing system that is capable of performing conferencing operations to transmit and receive captured audio and/or video signals/streams to/from the far-end system 103 over the data connection 109. For example, the near-end system 101 may be a laptop computer, a desktop computer, a tablet computer, a conference phone, and/or a mobile device (e.g., cellular telephone or mobile media player). Each element of the near-end system 101 shown in FIG. 2 will now be described. In one embodiment, the elements of the far-end system 103 may be similar or identical to the elements of the near-end system 101.

Figure 3:
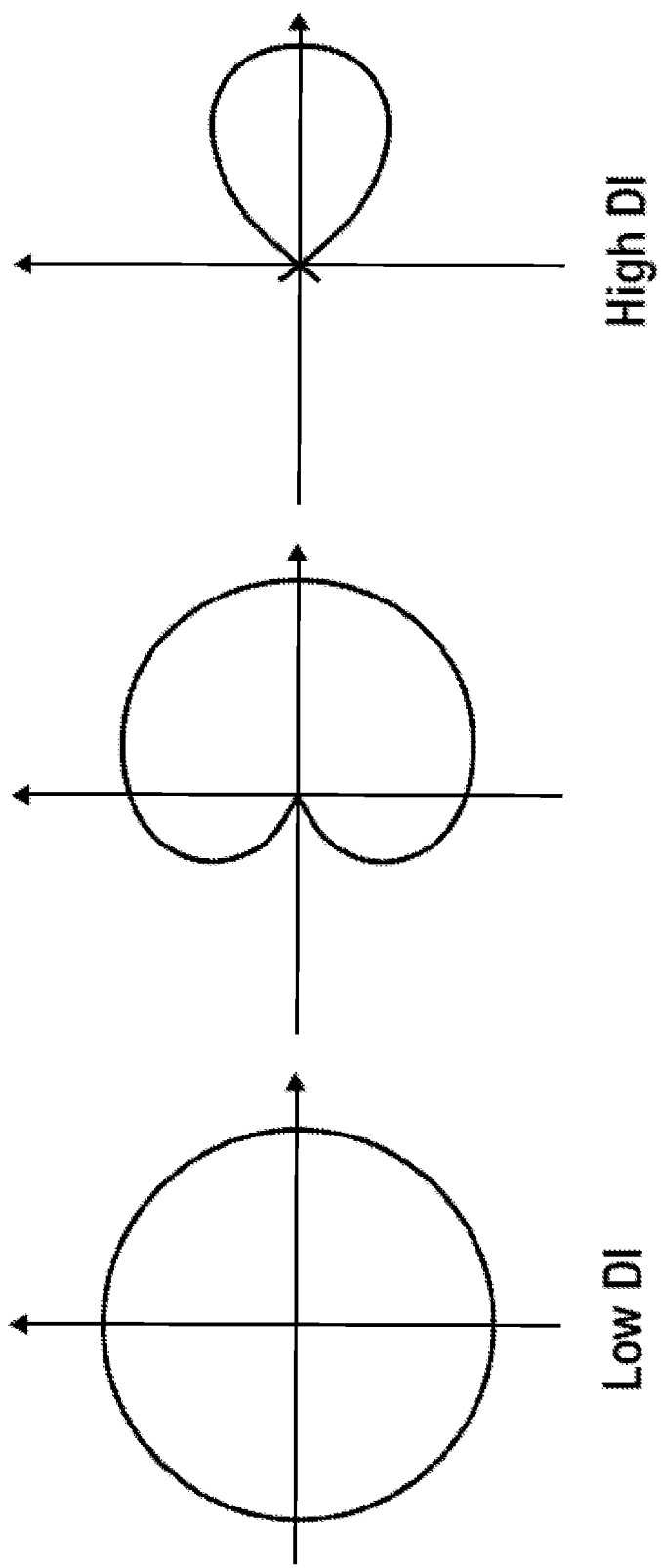
FIG. 3 shows various beam patterns with varied directivity indexes that may be generated using microphones in a microphone array according to one embodiment.

As noted above, in one embodiment, the near-end system 101 may include a microphone array 105A. The microphone array 105A may be composed of N microphones 201 (N>2) that sense sounds and convert these sensed sounds into electrical signals. The microphones 201 may be any type of acoustic-to-electric transducer or sensor, including a Micro-Electrical-Mechanical System (MEMS) microphone, a piezoelectric microphone, an electret condenser microphone, or a dynamic microphone. The microphones 201 in the microphone array 105A may utilize various weights and delays to provide a range of beam/polar patterns, such as cardioid, omnidirectional, and figure-eight patterns. An individual microphone may also be used as a "beam" to produce a desired response. Thus in the text to follow it should be understood that the term beam may also refer to the output from a single microphone. The generated beam patterns, in particular when beams result from combining single microphones, alter the direction and area of sound captured in the vicinity of the first location 115A. In one embodiment, the beam patterns of the microphones 201 may vary continuously over time. In another embodiment a number, e.g. B, of simultaneous fixed-beam patterns may be processed and produced in parallel. FIG. 3 shows various beam patterns with varied directivity indexes that may be generated using the microphones 201 in the microphone array 105A. In this example, the directivity indexes of the beam patterns increase from left to right.

Figure 4B:
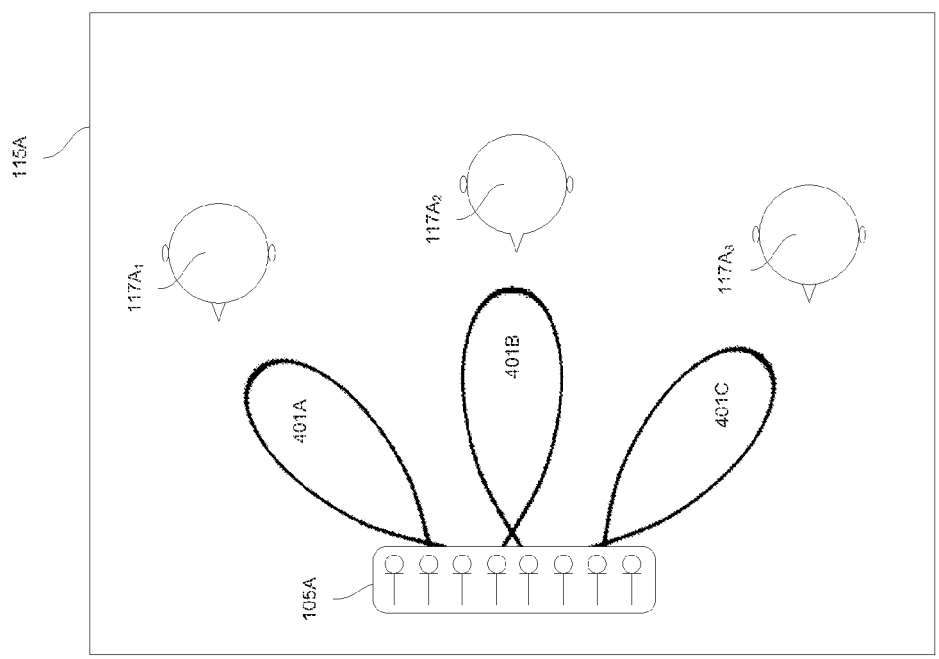
FIG. 4B shows various beam patterns that cover various areas of a location relative to multiple users according to one embodiment.

In one embodiment, separate sets of microphones 201 within the microphone array 105A may be used to capture separate areas of the first location 115A. In this embodiment, each set of microphones 201 may generate a separate beam pattern that is directed at a particular area of the first location 115A. For example, as shown in FIG. 4A, the microphones 201 may generate five separate fixed beams 401A-401E. As shown, the beams 401A and 401B are focused in an area of the first location 115A to the right of the user 117A, the beam 401C is focused in an area of the first location 115A occupied by the user 117A, and the beams 401D and 401E are focused in an area of the first location 115A to the left of the user 117A. In some embodiments, beams generated by the microphones 201 in the microphone array 105A may be focused directly at separate users $117A_1$-$117A_3$ in the first location 115A. For example, as shown in FIG. 4B, the microphones 201 in the microphone array 105A may generate three separate beams 401A, 401B, and 401C. As shown, the beam 401A is focused in an area of the first location 115A occupied by the user $117A_1$, the beam 401B is focused in an area of the first location 115A occupied by the user $117A_2$, and the beam 401C is focused in an area of the first location 115A occupied by the user $117A_3$. Although shown in FIGS. 4A and 4B and described in relation to five and three beams, respectively, the N microphones 201 in the microphone array 105A may generate any number of beams with uniform or non-uniform directivities, directions, etc.

In one embodiment, the near-end system 101 may include a network interface 202 for transmitting and receiving signals to/from the far-end system 103. For example, the network interface 202 may transmit audio and/or video signals over the data connection 109 via the network interface 202. The network interface 202 may operate using any combination of wired and wireless protocols and standards, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards.

As noted above, the near-end system 101 may include a speaker 113A for outputting audio received from the far-end system 103. As shown, the speaker 113A may receive audio signals from the far-end system 103 via the network interface 202. In one embodiment the speaker 113A may be a speaker array that includes multiple transducers 203 housed in a single cabinet. In this example, the speaker 113A has ten distinct transducers 203 evenly aligned in a row within a cabinet. In other embodiments, different numbers of transducers 203 may be used with uniform or non-uniform spacing and alignment. For example, although shown and described as a speaker array, in other embodiments the speaker 113A may include a single transducer 203.

The transducers 203 may be any combination of full-range drivers, mid-range drivers, subwoofers, woofers, and tweeters. Each of the transducers 203 may use a lightweight diaphragm, or cone, connected to a rigid basket, or frame, via a flexible suspension that constrains a coil of wire (e.g., a voice coil) to move axially through a cylindrical magnetic gap. When an electrical audio signal is applied to the voice coil, a magnetic field is created by the electric current in the voice coil, making it a variable electromagnet. The coil and the transducers' 203 magnetic system interact, generating a mechanical force that causes the coil (and thus, the attached cone) to move back and forth, thereby reproducing sound under the control of the applied electrical audio signal coming from a source (e.g., the far-end system 103).

Each transducer 203 may be individually and separately driven to produce sound in response to separate and discrete audio signals. By allowing the transducers 203 in the speaker 113A to be individually and separately driven according to different parameters and settings (including delays and energy levels), the speaker 113A may produce numerous directivity patterns to simulate or better represent respective channels of sound program content played to the near-end user 117A. For example, beam patterns of different widths and directivities may be emitted by the speaker 113A in the first location 115A. For instance, similar to the microphone array 105A, the speaker 113A may generate one or more of the beam patterns shown in FIG. 3. In one embodiment, as will be described in greater detail below, beam patterns generated by the speaker 113A may be altered to minimize echo picked up by the microphone array 105A while maintaining the sound level to the near-end user 117A.

Although shown as including one speaker 113A, the near-end system 101 may include any number of speakers 113A. Hereinafter, the near-end system 101 will be described as including a single speaker 113A; however, as described above, it is understood that the near-end system 101 may operate in a similar fashion with multiple speakers 113A.

The near-end system 101 may include a video camera 107A to capture scenes proximate to the near-end system 101 (e.g., in the first location 115A). The video camera 107A may be any type of video capture device, including units that use charge-couple device (CCD) and/or complementary metal-oxide-semiconductor (CMOS) active pixel sensors. As shown in FIG. 1, the video camera 107A may capture the near-end user 117A that is located proximate to the first location 115A. Although described and shown in FIG. 1 as a single near-end user 117A, in other embodiments multiple near-end users 117A may be captured by the video camera 107A. For example, as shown in FIG. 4B the users $117A_1$-$117A_3$ may use the near-end system 101 and accordingly be captured by the video camera 107A.

As noted above, the near-end system 101 may include a monitor 111A for displaying video. The video displayed on the monitor 111A may 1) be captured by the video camera 107A of the near-end system 101 and/or 2) be captured by the video camera 107B of the far-end system 103 and delivered to the near-end system 101 over the data connection 109 via the network interface 202. The monitor 111A may use any display technology, including a liquid crystal display (LCD) panel, a plasma display panel, and/or an organic light emitting diode (OLED) display panel.

Although shown as integrated within the same casing as other components of the near-end system 101, in some embodiments one or more of the video camera 107A, the microphone array 105A, the monitor 111A, and the speaker 113A may be separate and coupled to the other components of the near-end system 101 through wired or wireless mediums. For example, one or more of the video camera 107A, the microphone array 105A, the monitor 111A, and the speaker 113A may be coupled to other components of the near-end system 101 through the network interface 202. In this embodiment, the network interface 202 may be capable of transmitting signals using the Bluetooth suite of protocols or another short/near range wireless standard. In one embodiment, the downlink processing unit 219 may further process downlink signals received through the network interface 202 prior to the downlink signals being used to driver the speaker 113A.

As noted above, the far-end system 103 may include components similar or identical to the components of the near-end system 101. For example, the microphone array 105B, the video camera 107B, the monitor 111B, and the speaker 113B in the far-end system 103 may be similar or identical to the microphone array 105A, the video camera 107A, the monitor 111A, and the speaker 113A in the near-end system 101.

Figure 5:
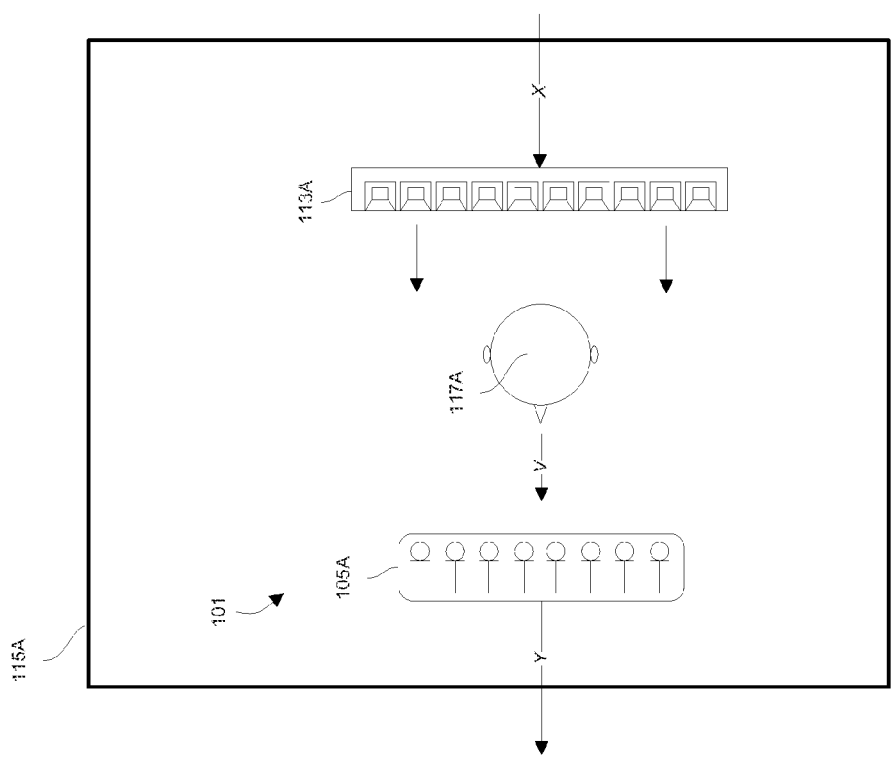
FIG. 5 shows sounds detected by a microphone array according to one embodiment.

In one embodiment, the near-end system 101 may include P echo cancellers 205 (P≥1) for removing echo from audio communications between the near-end system 101 and the far-end system 103. For example, as shown in FIG. 5 the near-end system 101 receives an audio reference signal X from the far-end system 103. The reference signal X may represent sound produced by the user 117B and detected by the microphone array 105B within the far-end system 103. In one embodiment, the reference signal X may be transported over the data connection 109 to the near-end system 101. Upon receipt, the speaker 113A may play the reference signal X to output corresponding sounds into the first location 115A. As shown in FIG. 5, the user 117A may emit sounds V concurrently with the playing of the reference signal X using the speaker 113A. The user 117A may also be any element in the vicinity of the microphone array 105A which produces acoustic output, e.g. appliances in the first location 115A, sound from far away sources such as cars, etc. The microphone array 105A may pick-up the sounds produced by the speaker 113A corresponding to the audio signal X together with the sounds V produced by the user 117A. This combination of picked-up sounds may be denoted as signal Y. Ideally, the signal Y picked-up by the microphone array 105A is represented as:

$$Y=X*V$$

Based on this ideal situation, removing the components of reference signal X from the signal Y to isolate or estimate the sounds V may be performed by subtracting the known signal X received from the far-end system 103 from the signal Y. However, this ideal situation is not reflective of real life conditions. In short, the sounds corresponding to the signal X picked-up by the microphone array 105A are influenced by the impulse response H of the first location 115A. There is an impulse response for each pair of transducers in 113A and each microphone or beam produced by the microphone array 105A. This impulse response H, which consists of many individual pair-wise relationships, may be based on the size of the echo path in which the reference sound travels before reaching the microphone array 105A and/or the strength of coupling between the speaker 113A and the microphone array 105A and the room or environment where the system is in operation (e.g., the first location 115A). Accordingly, in practice the signal Y picked-up by the microphone array 105A may be more accurately represented as:

$$Y=X*V*H$$

Based on this representation of the signal Y, the impulse response H for the echo path between the speaker 113A and the microphone array 105A must first be determined/estimated before the sounds V emitted by the user 117A can be estimated/isolated. Accordingly, the echo cancellers 205 must first estimate the impulse response H of the echo path between the speaker 113A and the microphone array 105A such that the echo cancellers 205 can generate an estimate signal V'. In practice H changes in time with changes in the environment and even with air temperature fluctuations. The estimated signal V, derived from appropriate use of X and the estimated impulse response H represents the sound produced by the user 117A after the estimated distortions produced by echo have been removed.

The generation by the echo cancellers 205 of an estimated impulse response may take a variable amount of time to compute. This time period may result in significant delay, which may negatively impact the operation of the near-end system 101. When such an estimate is deemed too inaccurate the state of the echo canceller 205 may be deemed to be un-converged. Thus un-converged echo cancellers 205 are not generally in a position to sufficiently remove echo in a signal. In addition, in both converged and un-converged states, the accuracy of this estimate H often depends on the computational resources assigned to and complexity of the algorithm used by the given echo canceller 205. For purposes of getting statistics of the echo properties experienced by a microphone 201 or beam a given complexity or algorithmic option may be employed. In general reduced complexity or computation may be employed. For the purpose of using a microphone 201 or beam for uplink transmission, more accurate estimates $\hat{H}$ of the respective impulse response(s) may be required with a different computational load or algorithmic option. In general such echo cancellers 205 used to process signals that are to be active in the uplink must be run continuously to track changes in H with sufficient accuracy in the estimate of $\hat{H}$.

Further, as noted above, modern systems often include a large number of microphones 201. In these large scale systems, applying echo cancellation to each individual microphone signal, or every possible beam, may be impractical as the number of echo cancellers 205 is often resource limited or otherwise constrained. Accordingly, as will be described in greater detail below, the near-end system 101 may attempt to more efficiently and proactively process sensed sounds such that delays are limited and processing resources are more effectively utilized.

In one embodiment, each of the P echo cancellers 205 may include an adaptive filter implemented in software and/or hardware within the near-end system 101. Each of the P echo cancellers also produce statistics, states, and output signals that may be included in uplink transmission. For example, each of the P echo cancellers 205 may operate as separate modules on one or more hardware processors operating within the near-end system 101. The echo cancellers 205 may take in a single microphone 201 signal or a beamformed set of microphone signals representing a microphone beam such that echo cancellation may be performed on the received signals.

In one embodiment, the near-end system 101 may include P statistics generators 206, which generate a series of statistics that characterize the signal Y and the echo cancelling process. These statistics generators 206 may be part of or in addition to the echo cancellers 205. For example, the statistics may include echo-level estimates per frame in a signal Y; local-voice-level estimates per frame in a signal Y where it is understood that local "voice" may include any acoustic signal in the first location 115A not produced by the speaker 113A and not necessarily comprising voice of the user(s) 117A; an indicator whether the corresponding echo canceller 205 has converged, adapted, or is changing rapidly; and delay measurements between a transducer 203 and a microphone 201 based on the estimates of impulse responses H of the corresponding echo path. The statistics described above are exemplary and in other embodiments, additional statistics may be generated by the P statistics generators 206 and echo cancellers 205. In one embodiment, the statistics may be provided/used by other components of the near-end system 101 as will be described in greater detail below.

In one embodiment, the near-end system 101 may include a microphone beamformer 207. The microphone beamformer 207 receives input signals from one or more of the microphones 201 in the microphone array 105A and generates one or more microphone beams based on these received signals. As shown, the beamformer 207 may receive up to N microphone signals, corresponding to the N microphones 201 in the microphone array 105A, and may generate up to B microphone beams based on these signals. For example, the beamformer 207 may utilize signals from the microphones 201 in the microphone array 105A to produce one or more of the beams shown in FIGS. 3, 4A, 4B, and 4C. In one embodiment, the beamformer 207 may utilize spatial filtering or other signal processing techniques for generating microphone beams. This may be achieved by combining elements in a phased array of microphone signals in such a way that signals at particular angles experience constructive interference while others experience destructive interference. For example, in some embodiments, phase and amplitude of one or more microphone signals may be adjusted to construct a microphone beam. In some embodiments some beams may use only a subset of microphones 201. In some embodiments one or more beams may represent individual microphone 201 outputs.

In one embodiment, the near-end system 101 may include a beam selector 209. The beam selector 209 determines M candidate beams, where M is greater than or equal to one. The M candidate beams may correspond to beams focused on areas of the first location 115A that are considered important or of interest and/or may become important or of interest in the near future. For example, a candidate beam may correspond to an area of the first location 115A occupied by the user 117A as represented by the beam 401C in FIG. 4A. In this example, the beam 401C focused on the user 117A is a candidate beam since it captures sound produced by the user 117A (e.g., speech produced by the user 117A) and accordingly may be of interest for processing and/or transmission to the far-end system 103. Other candidate beams may correspond to the locations immediately surrounding the user 117A (e.g., immediately to the left and right of the user 117A) as represented by the beams 401B and 401D in FIG. 4A. These candidate beams 401B and 401D, which are proximate to the user 117A, may be utilized when the user 117A moves to the left or to the right, respectively. Accordingly, the near-end system 101 may prefer that these beams 401B and 401D be prepared and ready when such a move occurs to avoid delays. In one embodiment, the preparation of a candidate beam may include the application of echo cancellation to the beam. Since echo cancellation/control requires time for convergence as described above, performing echo cancellation on a beam prior to its use ensures that there is minimal or no delay when audio corresponding to these beams is used by the near-end system 101. In other embodiments, preparation of a candidate beam may include application of echo cancellation to the beam at a sufficient computational complexity and algorithmic option to keep the echo canceller 205 sufficiently close, but not at, the best convergence state. The accuracy of echo statistics or the determination of an echo canceller state may not require the convergence necessary for use in uplink transmission.

Figure 4C:
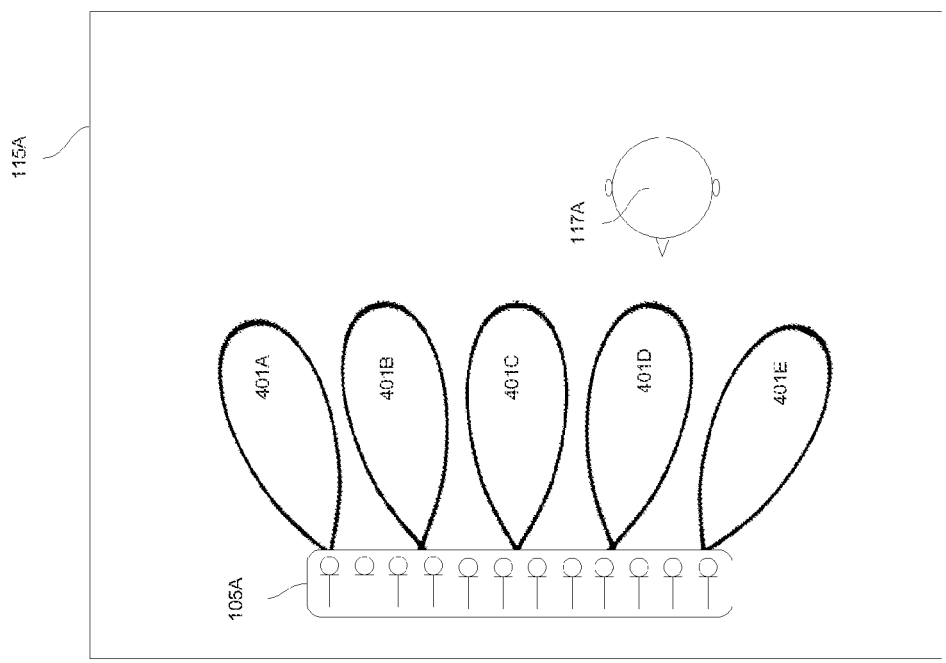
FIG. 4C shows various beam patterns that cover various areas of a location relative to a single user that is positioned to the left of a microphone array according to one embodiment.

In contrast to the beams 401B-401D in the FIG. 4A, which are determined to be candidate beams, the beams 401A and 401E may not be considered candidate beams. In this example, the beams 401A and 401E are relatively far from the user 117A in comparison to the beams 401B-401D and likely will not be used until the user 117A moves closer in proximity to the area covered by these beams 401A and 401E. Accordingly, the beam selector 209 may not select beams 401A and 401E as candidate beams. As shown in FIG. 4C, since the user 117A has moved to the left, the beam selector 209 may now select beams 401C-401E as candidate beams, as these beams 401C-401E cover areas closer in proximity to the user 117A than the areas covered by the beams 401A and 401B. As described above, the candidate beams selected by the beam selector 209 may be constantly changing and updated based on the movement of the user 117A and the areas of interest in the first location 115A as detected by the near-end system 101.

In one embodiment, the beam selector 209 may utilize statistics received from one or more of the statistics generators 206 for selecting the M candidate beams. For example, the beam selector 209 may determine for a signal Y associated with a microphone beam whether the beam is of interest and should be a candidate beam based on a ratio of local-voice-level estimates to echo-level estimates in a frame of the signal Y. In this example, a high ratio (i.e., a high level of voice in the signal Y) may indicate that the beam is focused on the user 117A and accordingly is of interest. In another example, in FIG. 4A a beam such as the beam 401C may, depending on the location of the speaker 113A in FIG. 5, show both strong coupling to the near end user 117A and to the speaker 113A. Thus both high local-voice and echo levels may result in a situation where even with full echo cancellation applied the output of the echocanceled beam 401C is not appropriate or preferred for use in the uplink transmission despite being pointed at the user 117A. Conversely, a low ratio may indicate that the microphone beam is focused considerably away from the user 117A and accordingly is not of interest. However, such a beam may also have less echo coupling. In the example shown in FIG. 4A, the beam 401C may have a higher ratio of local-voice-level estimates in comparison to the beams 401A and 401E since this beam 401C is pointed directly at the near-end user 117A. In this example, the beam 401C could be considered more of interest than the beams 401A and 401E based on this higher level. However, information from the echo cancellers 205 and statistics generators 206 are also needed. Accordingly, beams 401A-E may all, at some point, be run with reduced computation/complexity echo cancellers 205 to determine the situation. Based on the situation appropriate subsets of beams may be assigned to full computation echo cancellers 205 and reduced computation echo cancellers 205. Although described in relation to ratios of local-voice-level estimates to echo-level estimates, in other embodiments the beam selector 209 may utilize other statistics received from one or more of the statistics generators 206 for selecting the M candidate beams.

In one embodiment the selection of beams, both important and candidate beams may be selected based on the relationship of their main lobes. For example in FIG. 4A if the beam 401B has been shown to be good in terms of local voice to echo ratios the beams 401A and 401C could be included in the candidate set. Depending on the statistics generated, these beams 401A and 401C may be included in either the reduced complexity set, or full complexity set, or excluded from consideration.

In one embodiment, video signals corresponding to video captured by the video camera 107A may be utilized and processed by the beam selector 209. In this embodiment, the beam selector 209 may determine candidate beams based on video captured by the video camera 107A. For example, the beam selector 209 may determine areas of the captured video corresponding to the user 117A (e.g., detection of the user 117A based on facial recognition, motion of the mouth of the user 117A, and/or an association with microphone beams in each area of the captured video). Since areas corresponding to the user 117A are likely to be of interest, microphone beams pointed at areas in the captured video corresponding to the user 117A may be added to the set of M candidate beams by the beam selector 209.

In one embodiment, the near-end system 101 may also include an echo canceller assignor 211. The echo canceller assignor 211 may assign the M candidate beams to one of the P echo cancellers 205. In one embodiment, this assignment may be performed based on the statistics generated by the statistics generators 206 associated with each echo canceller 205. For example, the candidate beams with the highest local-voice to echo ratios may be assigned to echo cancellers 205 while beams with lower ratios of local-voice to echo or showing echo cancelling problems (e.g., having issues adapting) may not be assigned or may be removed from a corresponding echo canceller 205. For example, echo canceller statistics could point to issues with a particular microphone 201 and/or issues with a particular echo path (e.g., a particular echo-path is very dynamic) or a location within the listening area 115A (e.g., room/directional noise). Based on these issues, an associated beam previously assigned to an echo canceller 205 may be removed in favor of a more favorable beam. Accordingly, a limited number of echo cancellers 205 may be used to process a larger number of microphone beams based on interest in the beams and properties of echo cancellation performed for each beam. In one embodiment, current statistics may be analyzed in view of historic statistics to determine candidate beams. For example, in one embodiment, microphone beams may require a showing of progressively improved ratios of signal energy to echo levels in order to be classified as a candidate beam and/or to be assigned to an echo canceller 205.

In one embodiment, a subset of the P echo cancellers 205 may be shared between multiple candidate microphone beams. For example, a set of two candidate microphone beams may be assigned to a single echo canceller 205. In this example, the reduced complexity echo canceller 205 may process each of the two microphone beams in a round robin fashion, appropriately switching internal states, such that impulse response estimates H for echo paths of each beam may be periodically generated though with slower convergence and possibly lower accuracy. In this fashion, an impulse response is continually maintained for each microphone beam in the set regardless of whether echo cancellation has been performed. In one embodiment, impulse response estimates may be generated for microphone beams at a prescribed interval (e.g., a frame interval or a time interval) while echo cancellation is continually performed for a subset of microphone beams every frame.

In one embodiment, a subset T of the P echo cancellers 205 may be dedicated to echo probing the first location 115A. In this embodiment, echo probing periodically analyzes a subset of the candidate microphone beams to determine echo levels for each of these candidate microphone beams. The echo levels for each analyzed microphone beam may be stored to determine the change in echo over time for separate areas of the first location 115A. As noted above and as shown in FIG. 6B, a subset of T of the P echo cancellers 205 may be dedicated to echo probing while the remaining P-T echo cancellers 205 may be dedicated to the most important candidate microphone beams. In particular, as shown in FIG. 6B, beams may be assigned to full-mode echo cancellers 205 while other beams are assigned to partial mode echo canceller 205 (i.e., partial mode echo cancellers 205 to produce echo statistics). In one embodiment, partial mode echo cancellers 205 may perform a first set of operations for generating statistics for corresponding microphone beams while the full mode echo cancellers 205 may perform echo cancellation for corresponding microphone beams using a second set of operations, wherein the first set of operations are a subset of the second set of operations. As probed microphone beams become more of interest (e.g., higher ratio of local voice to echo), an echo canceller 205 (e.g., a full mode echo canceller 205) may be separately assigned to these microphone beams.

In one embodiment, the near-end system 101 may include a switching device 213 for selecting one or more of the echo cancelled microphone beams to uplink to the far-end system 103. The switching device 213 may be a set of switches or other control logic which operates based on an uplink channel selector 215.

The uplink channel selector 215 may receive statistics from the statistics generators 206 associated with each of the echo cancellers 205 such that one or more beams, e.g., S beams, may be selected for uplink to the far-end system 103. In one embodiment, the uplink channel selector 215 may select an echo cancelled microphone beam only when 1) the echo canceller 205 that is used to process a corresponding microphone beam has adapted (i.e. has converged) or 2) each of the P echo cancellers determine that there is no significant echo on any microphone beam being processed by the echo cancellers 205 (i.e., echo for each candidate microphone beams is below a predefined echo threshold). In one embodiment, even if a microphone beam meets the above criteria, the microphone beam may still not be selected for uplink by the uplink channel selector 215 unless 1) the local voice to echo ratio for the microphone beam exceeds a predefined local voice to echo threshold and 2) based on statistics from the echo cancellers 205, significant non-linear echo control will not be needed.

Based on the decisions generated by the uplink channel selector 215, the switching device 213 may be triggered to transmit the selected processed beam patterns to the far-end system 103. In one embodiment, this transmission is performed by the network interface 202 over the data connection 109. In one embodiment, the near-end system 101 may include one or more further uplink processing modules 217. In this embodiment, the further uplink processing modules 217 may process the beam patterns selected by the uplink channel selector 215 and the switching device 213 to eliminate non-linear echo by residual echo suppression that may still be present in the selected beam patterns. For example, in one embodiment, the echo cancellers 205 may be linear echo cancellers while the additional echo suppression within 217 may be non-linear echo cancellers (i.e., residual echo suppressors). Other elements such as noise suppression, automatic gain control, and/or equalization may also be included in the further uplink processing modules 217. Accordingly, each of the echo cancellers 205 and the echo suppressors within the further uplink processing modules 217 may be adapted or chosen to control/cancel a specific type or component of the echo.

In one embodiment, the echo suppressors within the further uplink processing modules 217 may operate based on input from the statistics generators 206 and/or the uplink channel selector 215. In one embodiment echo suppressors within the further uplink processing modules 217 may also provide information to the uplink channel selector 215.

As described above, the near-end system 101 may generate a set of microphone beam patterns that may be intelligently assigned to a limited number of echo cancellers 205, which may be run at full computational load and/or algorithm complexity or in some reduced computational load or algorithm complexity. For example, the beam patterns may be classified based on generated statistics to determine beams of interest (e.g., beams with a high ratio of local voice to echo). Based on this ranking/classification of microphone beams, beams of greater interest may be assigned to dedicated echo cancellers 205 while less important beams may temporally remain unprocessed until these beams become of higher interest/importance. In view of the system 101 described above, a limited number of echo cancellers 205 may be used to intelligently process a larger number of microphone beams based on interest in the beams and properties of echo cancellation performed for each beam. As noted above, although described in relation to the near-end system 101, in some embodiments the far-end system 103 may be composed of similar components and similarly configured.

Figure 6A:
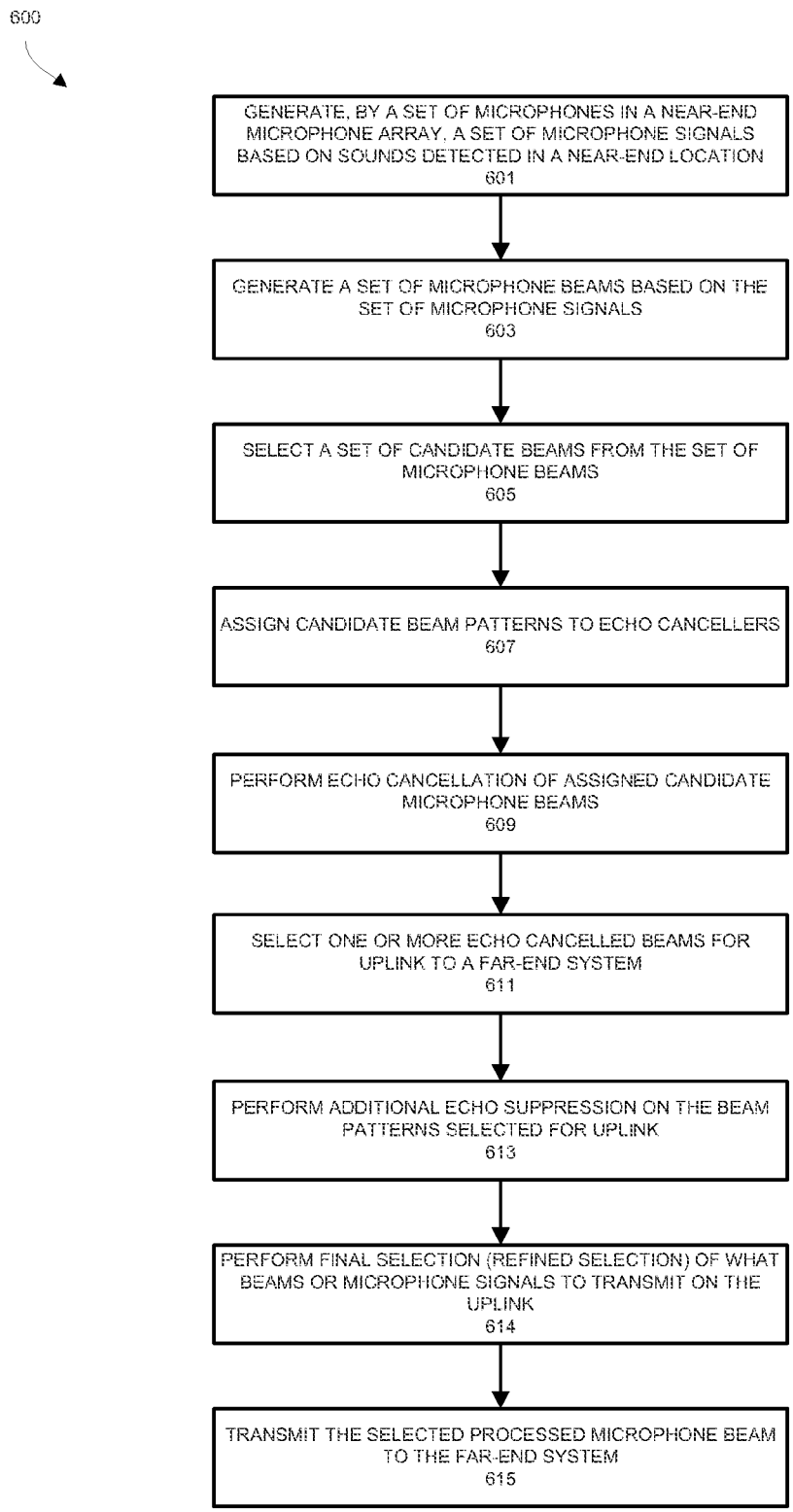
FIG. 6A shows a method for performing echo cancellation, wherein subsets of beams are assigned to echo cancellers and wherein selection of beams for output use in part statistics and state information from the echo-cancellers according to one embodiment.
Figure 6B:
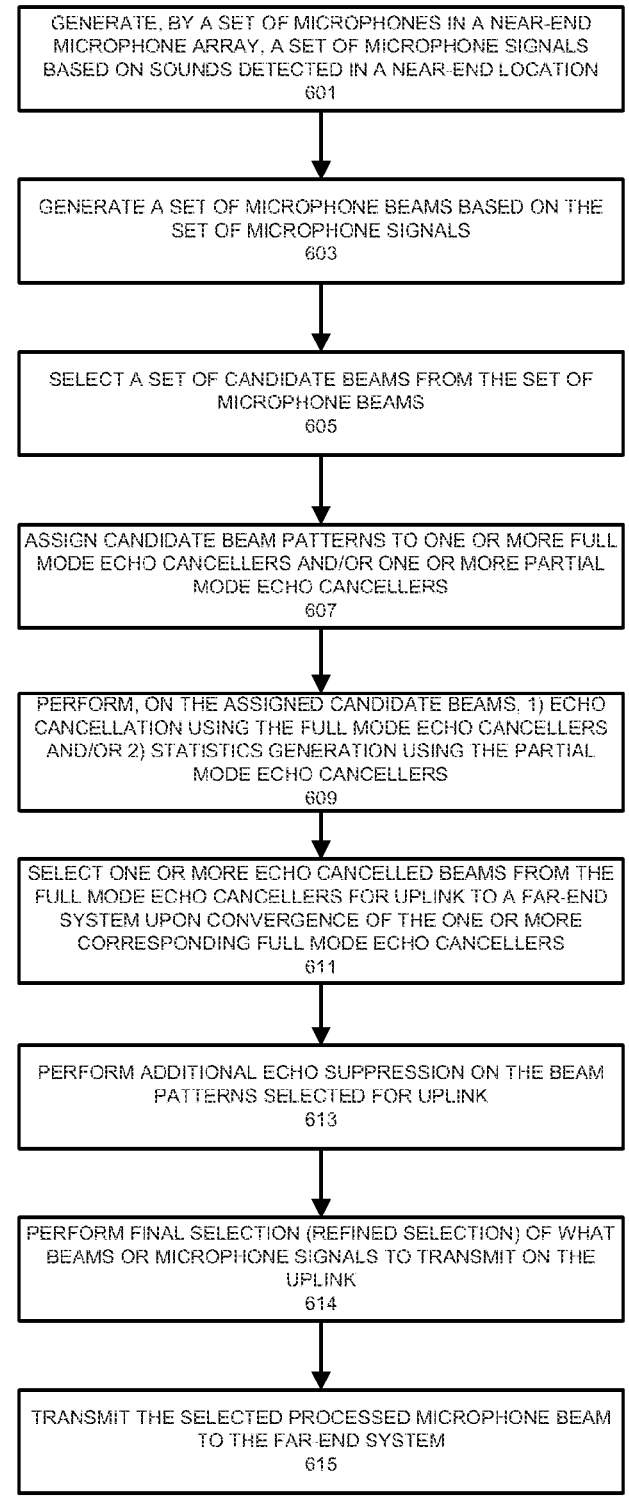
FIG. 6B shows a method for performing echo cancellation, wherein subsets of beams are assigned to echo cancellers which run in either full or partial modes and wherein selection of beams for output use in part statistics and state information from echo-cancellers according to another embodiment.

Turning now to FIG. 6A, a method 600 for performing echo cancellation will now be described. In one embodiment, the method 600 may be performed by one or more elements of the near-end system 101. In this embodiment, the processed audio signals generated by the method 600 may be used for conducting an audio conference with the far-end system 103. Although described as occurring sequentially, some of the operations of the method 600 may be performed concurrently or in an order different from that shown in FIG. 6A and described below. For example, these operations may be running continuously in time passing information between each other at various framing boundaries in the audio signal.

The method 600 may commence at operation 601 with the generation of a set of microphone signals based on sounds received at the microphones 201 in the first location 115A. For example, the microphone signals may be generated by one or more microphones 201 located within the microphone array 105A. The detected sounds represented by the microphone signals may include 1) sounds produced by the speaker 113A, which originated at the far-end system 103 and have been modified by the echo path between the speaker 113A and the microphone array 105A, and 2) sounds produced by the near-end user 117A (e.g., the voice of the near-end user 117A) or any other object or person in the vicinity of the microphone array 105A.

Based on the microphone signals generated at operation 601, operation 603 may generate a set of microphone beam patterns. In one embodiment, the microphone beamformer 207 may receive the microphone signals generated at operation 601 and generate one or more microphone beams based on these received signals at operation 603. As shown in FIG. 2, the beamformer 207 may receive up to N microphone signals, corresponding to the N microphones 201 in the microphone array 105A, and may generate up to B microphone beams based on these signals, where N and B are both greater than or equal to one. For example, the beamformer 207 may utilize signals from the microphones 201 in the microphone array 105A to produce one or more of the beams shown in FIGS. 3, 4A, 4B, and 4C. In one embodiment, the beamformer 207 may utilize spatial filtering or other signal processing techniques for generating microphone beams. This may be achieved by combining elements in a phased array of microphone signals in such a way that signals at particular angles experience constructive interference while others experience destructive interference. For example, in some embodiments, phase and amplitude of one or more microphone signals may be adjusted to construct a microphone beam.

Following the generation of microphone beams at operation 603, operation 605 may select a set of candidate microphone beams from the set of generated microphone beams. In one embodiment, at operation 605 the beam selector 209 may select a set of M candidate beams from the set of B beams, where M is greater than or equal to one. As noted above, the M candidate beams may correspond to beams focused on areas of the first location 115A that are considered important or of interest and/or may become important or of interest in the near future. In one embodiment, the candidate beams may be selected based on statistics generated by the statistics generators 206 for each beam currently being processed, while in other embodiments video signals produced by the video camera 107A may be utilized for the selection of candidate beams. As described above, the echo cancellers 205 and/or the statistics generators 206 may be continually analyzing microphone beams, even when echo cancellation on a respective beam is not being conducted. This analysis allows the production of beam statistics without the need for full echo cancellation processing on each beam.

Following selection of candidate beams at operation 605, operation 607 may assign one or more of the candidate beams to echo cancellers 205. In one embodiment, the echo canceller assignor 211 may attempt to assign each of the M candidate beams to one of the P echo cancellers 205 at operation 605. This assignment may be performed based on the statistics generated by the statistics generators 206 described above. For example, the candidate beams with the highest local-voice to echo ratios may be assigned to echo cancellers 205, while beams that are showing echo cancelling problems (e.g., having issues adapting) may not be assigned or may be removed from a corresponding echo canceller 205. For example, echo canceller statistics could point to issues with a particular microphone 201 and/or issues with a particular echo path (e.g., a particular echo-path is very dynamic) or a location within the first location 115A (e.g., room/directional noise). Based on these issues, a beam previously assigned to an echo canceller 205 may be removed in favor of a more promising beam. In these embodiments, M may be greater than P. Accordingly, and as shown in FIG. 6B, a limited number of echo cancellers 205 may be used to intelligently process a larger number of microphone beams based on interest in the beams and properties of echo cancellation performed for each beam. As noted above, multiple candidate beams may be assigned to a single echo canceller 205 and adaptation or echo cancellation may be performed in a round-robin or otherwise shared fashion. Otherwise, such reduced echo cancellation, sufficient for statistics gathering, may involve running reduced complexity algorithms of the echo cancellers 205. In particular, as shown in FIG. 6B, beams may be assigned to full-mode echo cancellers 205 while other beams are assigned to partial mode echo canceller 205 (i.e., partial mode echo cancellers 205 to produce echo statistics).

Following assignment of microphone beams to echo cancellers 205, operation 609 performs echo cancellation on the assigned microphone beams. For example, each of the P echo cancellers 205 in the near-end system 101 may process a corresponding assigned candidate microphone beam to produce a processed/echo cancelled candidate microphone beam. As noted above, the echo cancellation may include the generation of statistics related to the microphone beam and the echo cancellation process. For example, the statistics may include echo-level estimates per frame in a signal Y; local-voice-level estimates per frame in a signal Y; an indicator whether the corresponding echo canceller 205 has converged, adapted, or is changing rapidly; and delay measurements between a transducer 203A and a microphone 201 based on the impulse response of the first location 115A. The statistics described above are exemplary and in other embodiments, additional statistics may be generated at operation 609. In one embodiment, the statistics may be provided to and/or used by other operations of the method 600 as described above and as will be described in greater detail below. Accordingly, although shown as conducted sequentially, several of the operations within the method 600 may be performed concurrently such that results or data generated by one operation may be used by other operations.

Furthermore, in one embodiment operation 609 may include echo cancellers 205 run for the purpose of statistics generation only whereby the outputs of such cancellers 205 may not be suitable for use in the uplink transmission.

Following operation 609, operation 611 selects a processed microphone beam for uplink to the far-end system 103. In one embodiment, the switching device 213 may select a processed microphone beam for uplink based on inputs from the uplink channel selector 215. The uplink channel selector 215 may receive statistics from the statistics generators 206 such that one or more beams may be selected for uplink to the far-end system 103. In one embodiment, operation 611 may select an echo cancelled microphone beam for transmission to the far-end system 103 only when 1) the echo canceller 205 that is used to process a corresponding microphone beam has adapted or 2) each of the P echo cancellers determine that there is no significant echo on any microphone beam being processed by the echo cancellers 205 (i.e., echo for each candidate microphone beam is below a predefined echo threshold). In one embodiment, even if a microphone beam meets the above criteria, the microphone beam may still not be selected for uplink at operation 611 unless 1) the local voice to echo ratio exceeds a predefined local voice to echo threshold and 2) based on statistics from the statistics generators 206, significant non-linear echo control will not be needed.

Based on the decisions generated at operation 611, operation 613 may conduct additional echo suppression on the processed microphone beam selected at operation 611. The echo suppression performed at operation 613 may be separate and distinct from the echo cancellation performed by the echo cancellers 205 at operation 609. In this embodiment, the additional echo suppression may reduce the echo that may still be present in the selected processed beams. For example, in one embodiment, operation 609 may perform linear echo cancellation while operation 613 may perform non-linear echo suppression. Accordingly, each of the echo control operations 609 and 613 may be adapted or chosen to eliminate/cancel a specific type of echo. In some embodiments operation 613 may include further uplink processing.

Following the optional additional echo suppression at operation 613, operation 614 may make a final selection (refined selection) of what beams or microphone signals to transmit on the uplink. Operation 615 may transmit the processed microphone beam generated at operations 609, 611, and 613 to the far-end system 103. In one embodiment, this transmission may be performed by the network interface 202 via the data connection 109.

As described above, the method 600 may generate a set of microphone beams that may be intelligently assigned to a limited number of echo cancellers 205. For example, the beam patterns may be classified based on generated statistics to determine beams of interest (e.g., beams with a high ratio of local voice to echo). Based on this ranking/classification of microphone beams, beams of greater interest may be assigned to echo cancellers 205 while less important beams may temporally remain unprocessed until these beams become of higher importance/interest. Accordingly, by utilizing the method 600 a limited number of echo cancellers 205 may be used to intelligently process a larger number of microphone beams based on interest in the beams and properties of echo cancellation performed for each beam.

Figure 7:
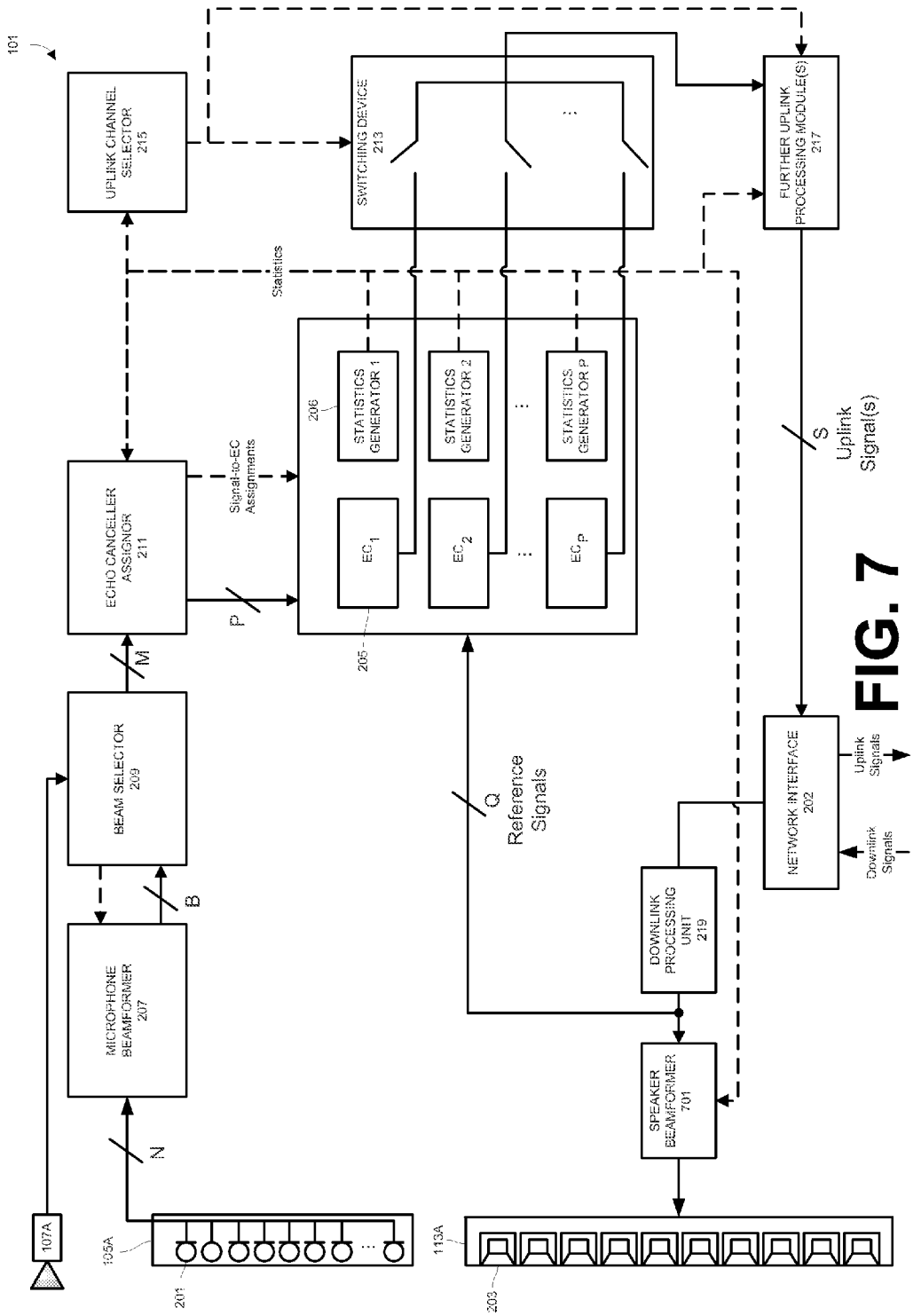
FIG. 7 shows a component diagram of the near-end system according to another embodiment.

Although described above in relation to adjustment of microphone beams, in some embodiments echo control may be performed through the adjustment of speaker beam patterns. For example, FIG. 7 shows a component diagram of the near-end system 101 according to another embodiment. As shown in FIG. 7, the near-end system 101 may also include a speaker beamformer 701 in addition to the components shown in FIG. 2.

In one embodiment, the speaker beamformer 701 may generate and adjust one or more beams produced by the speaker 113A based on audio signals received from the far-end system 103. This adjustment may seek an output that results in the minimization of echo picked-up by one or more microphone signals produced by the microphones 201 and/or one or more microphone beams produced by the microphone beamformer 207 while maintaining or maximizing the sound level at the user 117A.

Figure 8:
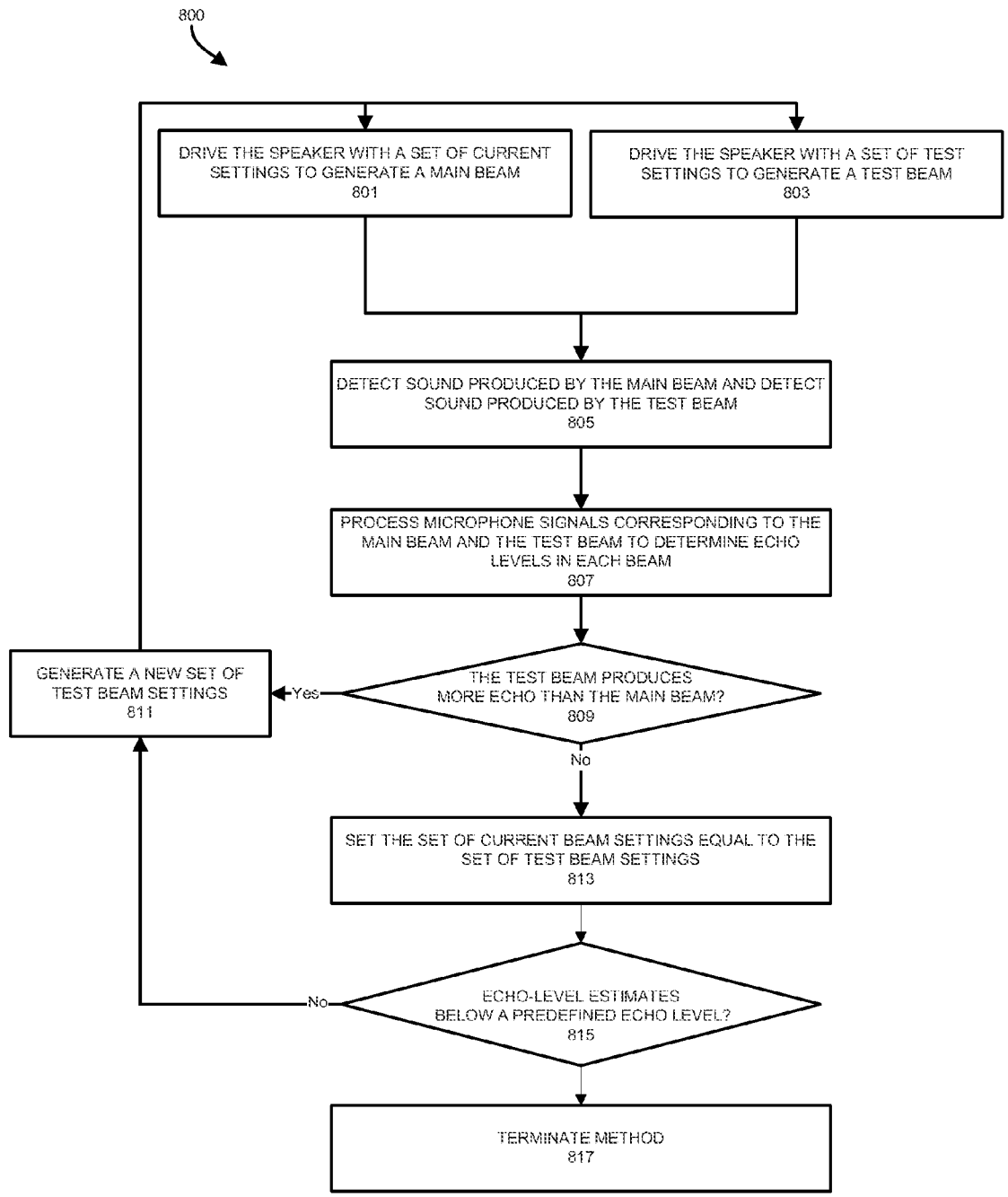
FIG. 8 shows a method for generating and adjusting beams for a speaker according to one embodiment.

FIG. 8 shows a method 800 for generating and adjusting beams for the speaker 117A using the near-end system 101 shown in FIG. 7 according to one embodiment. As described above, the method 800 may minimize echo picked-up by one or more microphone beams produced by the microphone beamformer 207 while maintaining or maximizing the sound level at the user 117A. In one embodiment, the method 800 may be performed along with the method 600 for controlling echo in a set of microphone beams. Accordingly, echo control may be performed through both the processing of microphone beams (i.e., the method 600) and the selection of speaker beams (i.e., the method 800). Each operation of the method 800 may be performed by one or more components of the near-end system 101 shown in FIG. 7 as described below.

In one embodiment, the method 800 may be triggered by the detection of an echo level above a predefined threshold. In other embodiments, the method 800 may be performed periodically or upon the commencement of an audio conference between the near-end system 101 and the far-end system 103.

Figure 9:
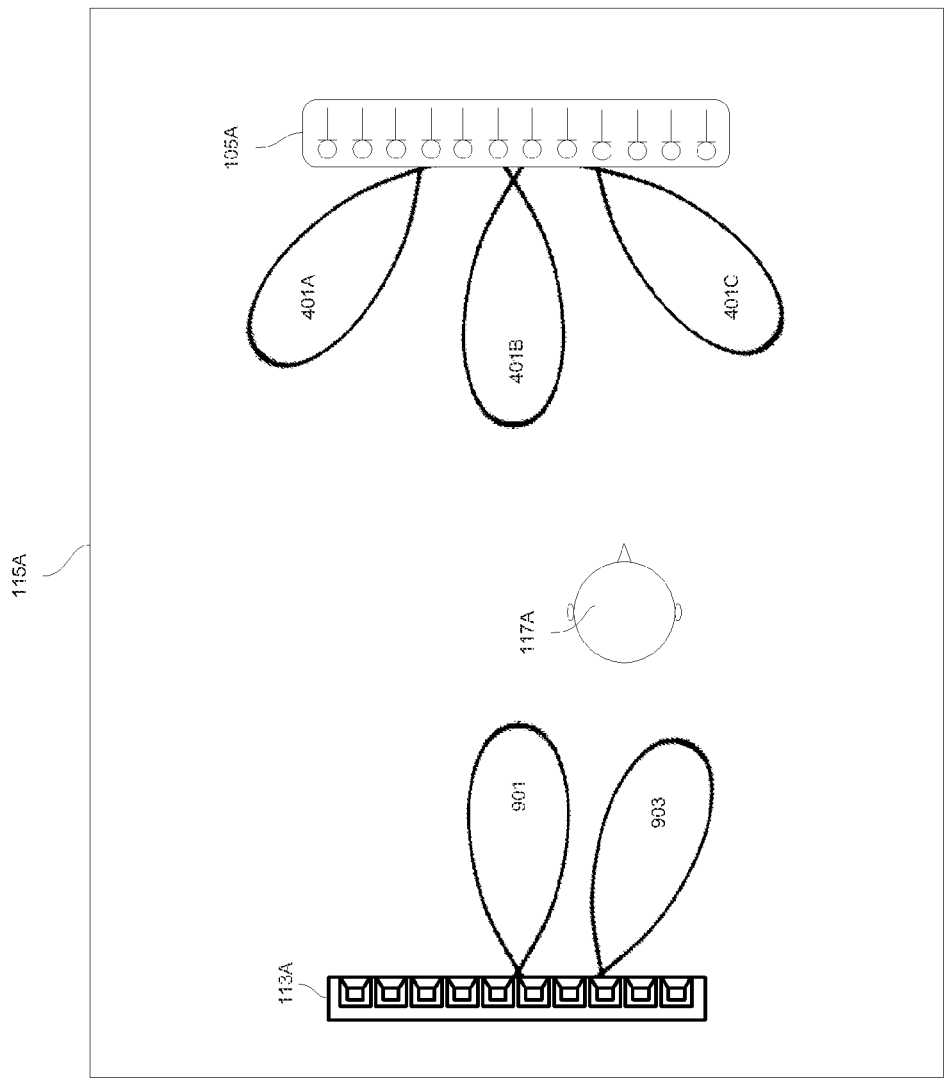
FIG. 9 shows a main beam and a test beam generated by a speaker according to one embodiment.

The method 800 may commence at operation 801 with the output of sound by the speaker 113A using a set of current speaker beam settings. The set of current speaker beam settings reflect settings that were previously used by the near-end system 101 to drive the speaker 113A or are a set of default settings for the near-end system 101. In one embodiment, the transducers 203 in the speaker 113A may utilize various weights and delays to provide a range of beam/polar patterns, such as cardioid, omnidirectional, and figure-eight patterns. The generated beam patterns alter the direction and area of sound output in the vicinity of the first location 115A. FIG. 3 shows various beam patterns with varied directivity indexes that may be generated using the transducers 203 in the speaker 113A. In this example, the directivity indexes of the beam patterns increase from left to right. As shown in FIG. 9, the main beam 901 may be generated by the speaker beamformer 701 and the speaker 113A based on the set of current speaker beam settings, which may be preset prior to the commencement of the method 800 or may be the product of a previous run of the method 800.

Following operation 801 or concurrently with operation 801, operation 803 may generate a test beam 903 based on a set of test beam settings as shown in FIG. 9. Similar to operation 801, operation 803 may utilize various weights and delays to provide a range of beam/polar patterns, such as cardioid, omnidirectional, and figure-eight patterns. In one embodiment, the set of test beam settings may be different from the set of current beam settings. For example, the test beam 903 and the main beam 901 may be characterized by different directivity indexes and/or different angles/directions. In one embodiment, the set of test beam settings used to generate the test beam 903 are selected to potentially reduce the level of echo picked-up by the microphone array 105A while maintaining the same sound level at the user 117A as the main beam 901.

In one embodiment, the signal used to drive the speaker 113A to generate the test beam 903 may be selected to be low in level and masked by the signal used to produce the main beam 901 such that the sound produced by the test beam 903 is not perceived by the user 117A. For example, the main beam 901 may be driven with an audio signal intended to be heard by the user 117A (e.g., a musical composition or the track of a movie) while the test beam 903 may be driven with a test signal not intended to be perceived/detected by the user 117A (e.g., pseudo-random orthogonal signals).

As noted above, the main beam 901 and the test beam 903 may be generated concurrently by the speaker 113A. In this embodiment, sets of transducers 203 in the speaker 113A may be designated to produce each of the main beam 901 and the test beam 903. In some embodiments, these sets of beams may share transducers 203 while in other embodiments the sets of transducers 203 may be distinct.

Following the generation of the main beam 901 and the test beam 903, operation 805 may detect sound produced by each beam 901 and 903. For example, as shown in FIG. 9 the sound produced by the main beam 901 and the test beam 903 may be picked-up by the microphone array 105A. At operation 807, signals corresponding to each of these sets of detected sounds may be analyzed and processed by echo cancellers 205. In one embodiment, the processing performed at operation 807 may include the generation of one or more statistics describing the picked up sounds associated with the main beam 901 and the test beam 903. For example, operation 807 may generate voice level estimates, echo level estimates, and ratios of local-voice-level estimates to echo-level estimates for frames of signals corresponding to each of the main beam 901 and the test beam 903. These statistics may be produced by the statistics generators 206 associated with each corresponding echo canceller 205 processing the main and test beams 901 and 903.

At operation 809, the statistics generated at operation 807 are compared to determine whether the test beam 903 produces less echo than the main beam 901, the test beam 903 has a higher ratio of local-voice-level estimates to echo-level estimates than the main beam 901, or has other characteristics that may be preferable over the main beam 901. When the test beam 903 produces more echo than the main beam 901, the method 800 may move to operation 811 to generate a new set of test beam settings. This new set of test beam settings may be selected to reduce echo (i.e., increase the ratio of local-voice-level estimates to echo-level estimates) based on previously performed tests. Thereafter, the method 800 may move back to operation 801 to again attempt to produce a test beam 903 with a reduced echo level in comparison to the main beam 901.

In contrast, when operation 809 determines that the main beam 901 produces more echo than the test beam 903, the method 800 may move to operation 813 to set the main beam settings equal to the test beam settings. Since the test beam 903 produced less echo than the main beam 901, the test beam settings are considered more desirable and will be used thereafter for driving the speaker 113A. Following operation 813, the method 800 may move to operation 815 to determine whether the echo level for the test beam 903 (now the main beam 901) is greater than a predefined echo level. This predefined echo level may be preset by an administrator of the system 100, may be configurable by the user 117A and/or the user 117B, and/or be automatically set by the near-end system 101. In one embodiment, this predefined echo level may be utilized for triggering the method 800 as described above.

When the echo-level estimates produced by the new main beam settings are greater than or equal to the predefined echo level, the method 800 may terminate at operation 817. In contrast, when echo-level estimates produced by the new main beam settings are below the predefined echo level, the method 800 may move to operation 811 to generate a new set of test beam settings. As noted above, these new set of test beam settings may be selected to decrease echo levels based on previously performed tests. Thereafter, the method 800 may move back to operation 801 to again attempt to produce a test beam with a reduced echo level.

As described above, the operations of the method 800 may be continually performed until echo detected by the microphone array 105A decreases to a predefined echo level.

In one embodiment, the method 800 may be conducted slowly on long term stable estimates of the echo paths and hence avoid/ignore the perturbations caused by small changes in the first location 115A (e.g., people walking around). In one embodiment, the method 800 may be conducted when communications with the far-end system 103 are being conducted or when no communications have been instigated between the near-end system 101 and the far-end system 103 (e.g., during the playback of music on the near-end system 101 or during a testing/initialization procedure for the near-end system 101). By generating a test beam 903, the method 800 attempts to reduce the level of echo detected by the microphone array 105A through the adjustment of settings for the speaker 113A instead of adjustment of settings for the microphone array 105A. However, as noted above, the method 800 may be performed concurrently or otherwise in addition to the method 600 such that echo is controlled in the system 100 through the adjustment/processing of both speaker and microphone beams.

Figure 10:
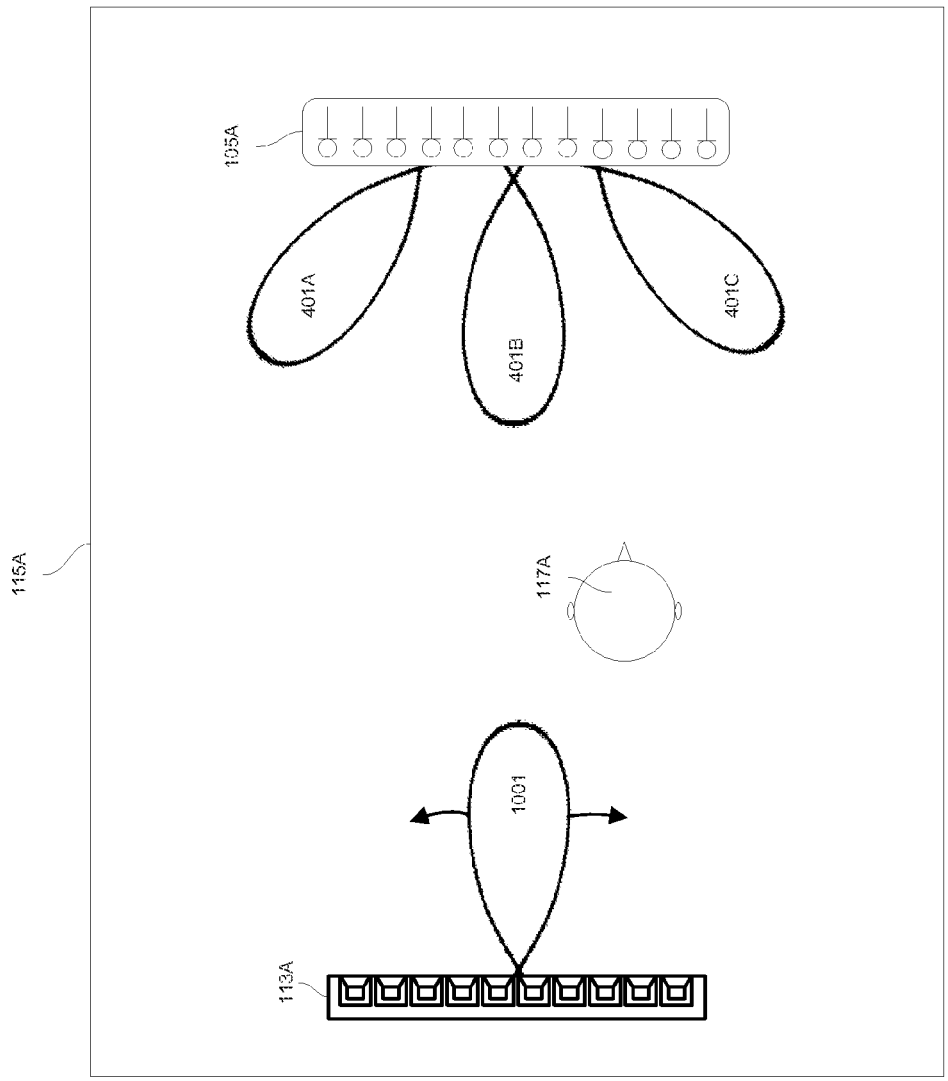
FIG. 10 shows a beam pointed in a first direction according to one embodiment.
Figure 11:
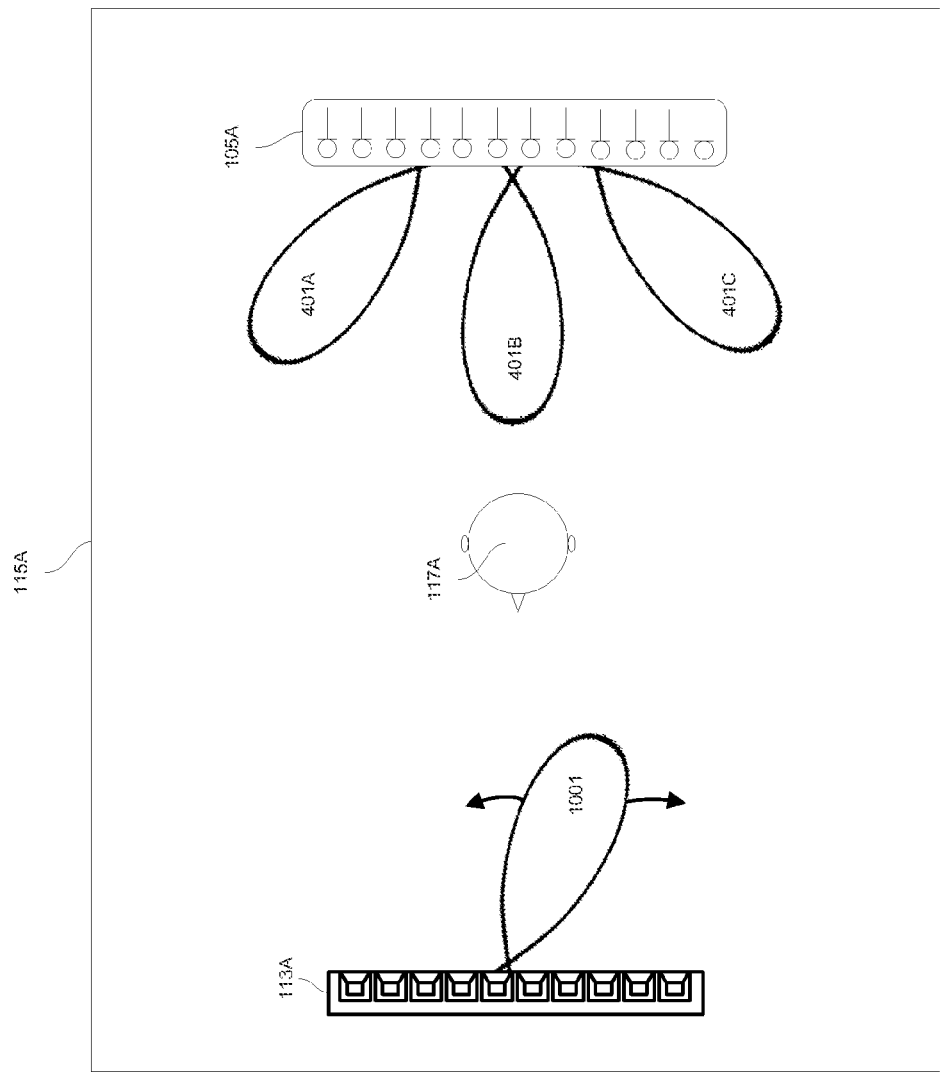
FIG. 11 shows the beam panned to a second direction according to one embodiment.

As described above, multiple beams are generated simultaneously (e.g., the main beam 901 and the test beam 903 or generated concurrently or during overlapping time periods) in an attempt to control echo. In other embodiments, a single beam that varies over time may be utilized to control echo. This single beam may be constantly driven by the same audio signal such that audio for the user 117A is uninterrupted and free of distortions from other audio signals. For example, as shown in FIG. 10, the beam 1001 may be panned clockwise or counterclockwise. In the example shown in FIG. 11, the beam 1001 may be panned in a first direction. Upon detecting by the microphone beams 401A-401C a lower echo level in this direction, the near-end system 101 may continue to pan the beam 1001 until a predefined echo level is achieved. Alternatively, upon detecting a higher echo level, the near-end system 101 may pan the beam 1001 in an alternate direction until a predefined echo level is achieved. Thus, a single speaker beam may be used to minimize echo picked-up by one or more microphone beams produced by the microphone beamformer 207 while maintaining or maximizing the sound level at the user 117A.

Figure 12:
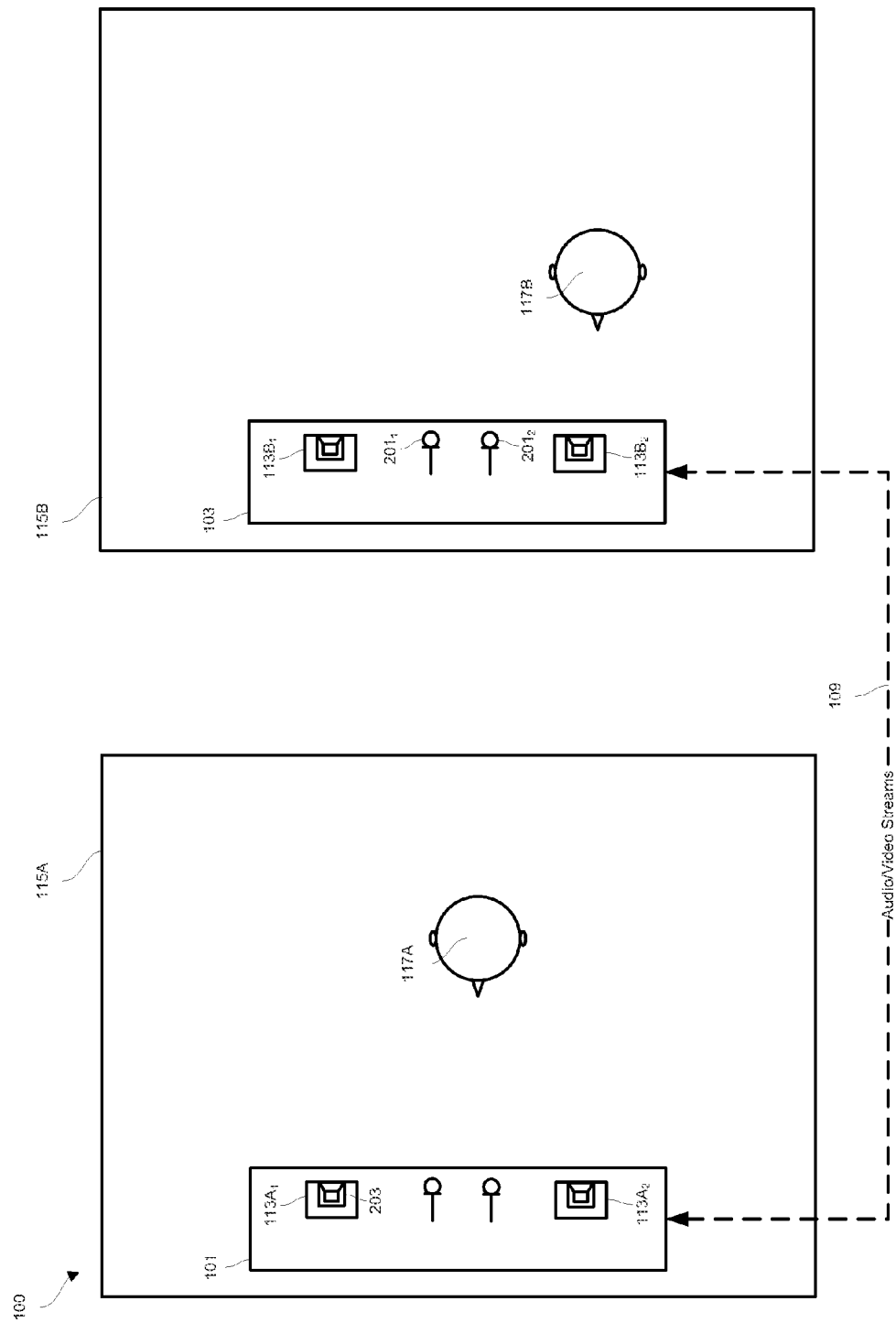
FIG. 12 shows a conference system that transfers audio and/or video signals/streams between a near-end computing system and a far-end computing system according to another embodiment.

In the embodiments of the conference system 100 described herein, the audio conferences may be either multi-channel (e.g., stereo audio conferencing) or mono-channel. One of the main advantages of multi-channel audio conferencing is the users 117A and 117B may be imaged more accurately in comparison to mono-channel audio conferencing. For example, as shown in FIG. 12, the user 117B may emit sound that is detected by the microphones $201_1$ and $201_2$ in the far-end system 103. In the example shown in FIG. 12, the user 117B may be closer to the microphone $201_2$. Each of the microphone signals from the microphones $201_1$ and $201_2$ may thereafter be transmitted to the near-end system 101 via the data connection 109. The near-end system 101 may thereafter blindly play each of the microphone signals from the microphones $201_1$ and $201_2$ through the individual transducers 203 in the speakers $113A_1$ and $113A_2$, respectively. Since the user 117B was closer to the microphone $201_2$, sound emitted by the near-end system 101 corresponding to the user 117B will appear panned toward the speaker $113A_2$. This stereo/multi-channel audio conferencing thus more closely imitates the positioning of audio sources.

Despite the advantages associated with stereo audio conferencing, there may be some problems associated with stereo echo cancellation. For example, microphone signals produced by the two microphones $201_1$ and $201_2$ shown in FIG. 12 are correlated since they are based on sound produced by the same source (e.g., the user 117B). Based on this correlation, stereo echo cancellation leads to a non-unique solution which depends on the source's position. De-correlation techniques may be used to de-correlate the two received microphone signals for stereo echo cancellation at the near-end system 101. However, these de-correlation techniques may introduce artifacts into the signals. Further, even with the utilization of de-correlation techniques, more complex adaptation methods such as recursive least-squares (RLS) processes may still be needed to obtain faster convergence times by associated echo cancellers 205.

To overcome the above issues with stereo echo cancellation, the near-end and/or far-end systems 101 and 103 may simulate the positioning of the users 117B and 117A, respectively, through the use of selected microphone beams and corresponding speaker beams in each of the system 101 and 103. As will be described in greater detail below, echo cancellation may be performed using pre-computed impulse response estimates H corresponding to each permutation of microphone beams selected for each system 101 and 103. Since this approach no longer relies on the transmission of separate correlated signals, but instead transmits a single microphone beam, stereo echo cancellation is no longer needed. Instead, mono-echo cancellation may be used while still allowing the system 101 and 103 to properly image the users 117A and 117B.

Figure 13:
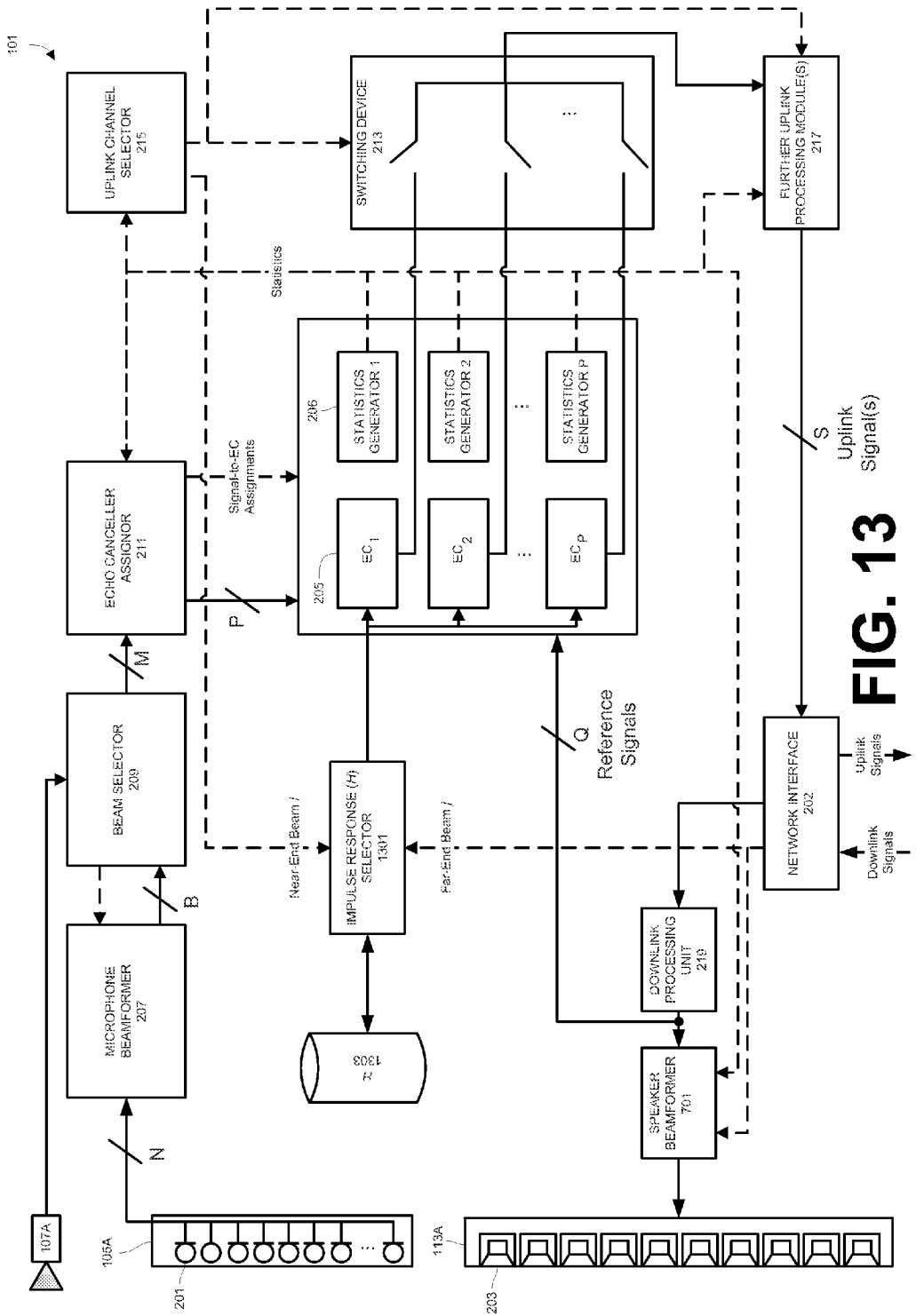
FIG. 13 shows a component diagram of the near-end system according to another embodiment of the invention.

FIG. 13 shows a component diagram of the near-end system 101 according to another embodiment of the invention. In some embodiments, the far-end system 103 may be similarly configured to the near-end system 101 shown in FIG. 13. As shown, the near-end system 101 may include an impulse response selector 1301 that receives a selection of the microphone beam j used by the far-end system 103 to detect sounds in the second location 115B. This selected microphone beam j may be transmitted to the near-end system 101 along with audio signals Q corresponding to the selected microphone beam. For example, as shown in FIG. 13, data describing the selected microphone beam j may be received by the network interface 202 from the far-end system 103 and transferred to the impulse response selector 1301 for processing.

Figure 14:
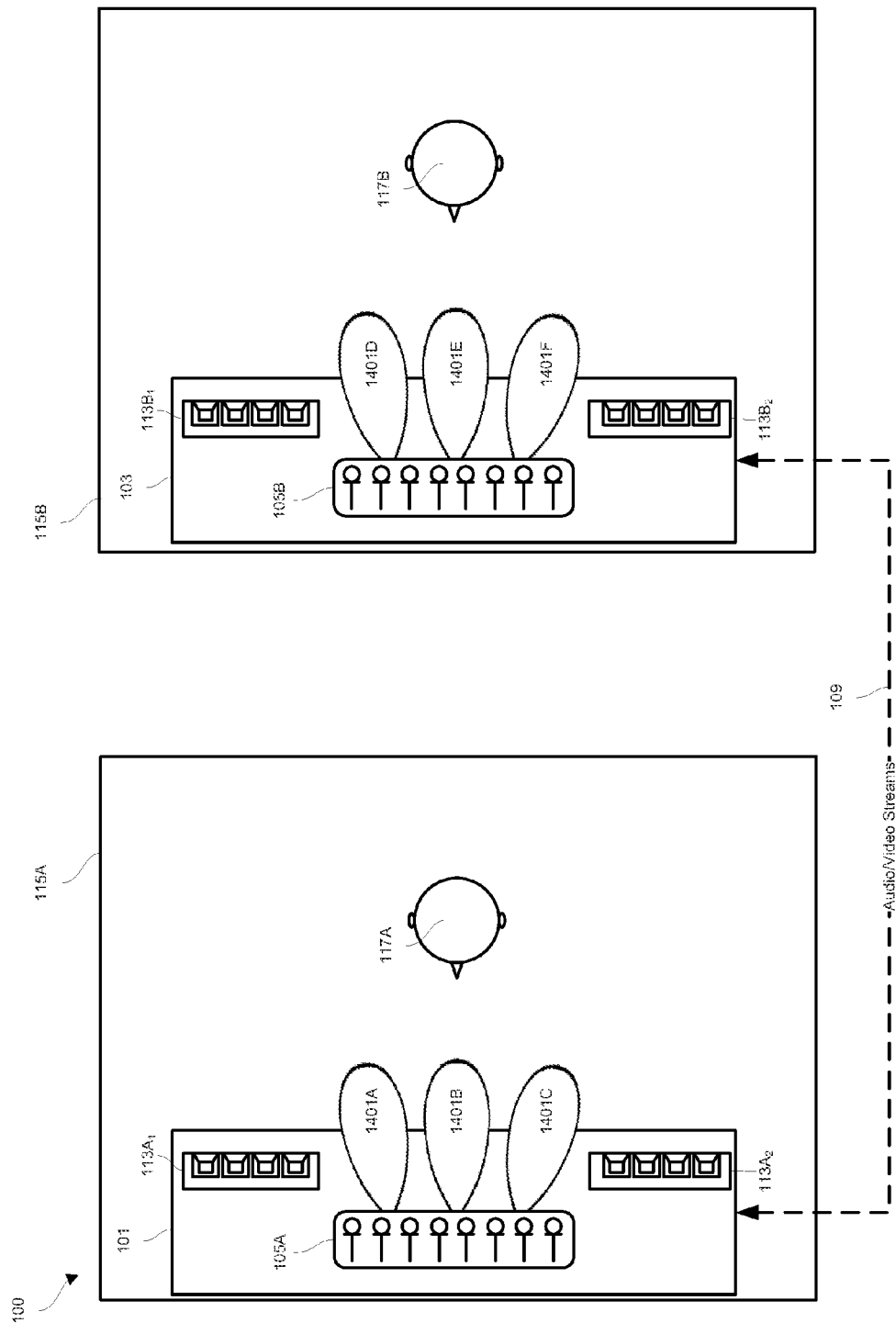
FIG. 14 shows microphone beams produced by a near-end system and a far-end system according to one embodiment.

In one embodiment, the impulse response selector 1301 may also receive the microphone beam i currently being used by the near-end system 101 to detect sounds in the first location 115A. For example, the uplink channel selector 215 may pass data describing the selected microphone beam i to the impulse response selector 1301. The data describing the microphone beams i and j may be any data that can uniquely identify the microphone beams i and j used by the systems 101 and 103. For example, as shown in FIG. 14, the microphone arrays 105A and 105B may respectively produce the beams 1401A-1401F. Each of these microphone beams 1401A-1401F may be identified by a name, serial number, or any other unique identifier. In one embodiment, the selection of the microphone beams i and j by the systems 101 and 103 may be based on an echo level, a local voice level, and/or a ratio of local-voice-level estimates to echo-level estimates for each of the beams 1401A-1401F. For example, the near-end system 101 may select the beam 1401A-1401C with the highest ratio of local-voice-level to echo-level while the far-end system 103 may select the beam 1401D-1401F with the highest ratio of local-voice-level to echo-level.

Figure 15B:
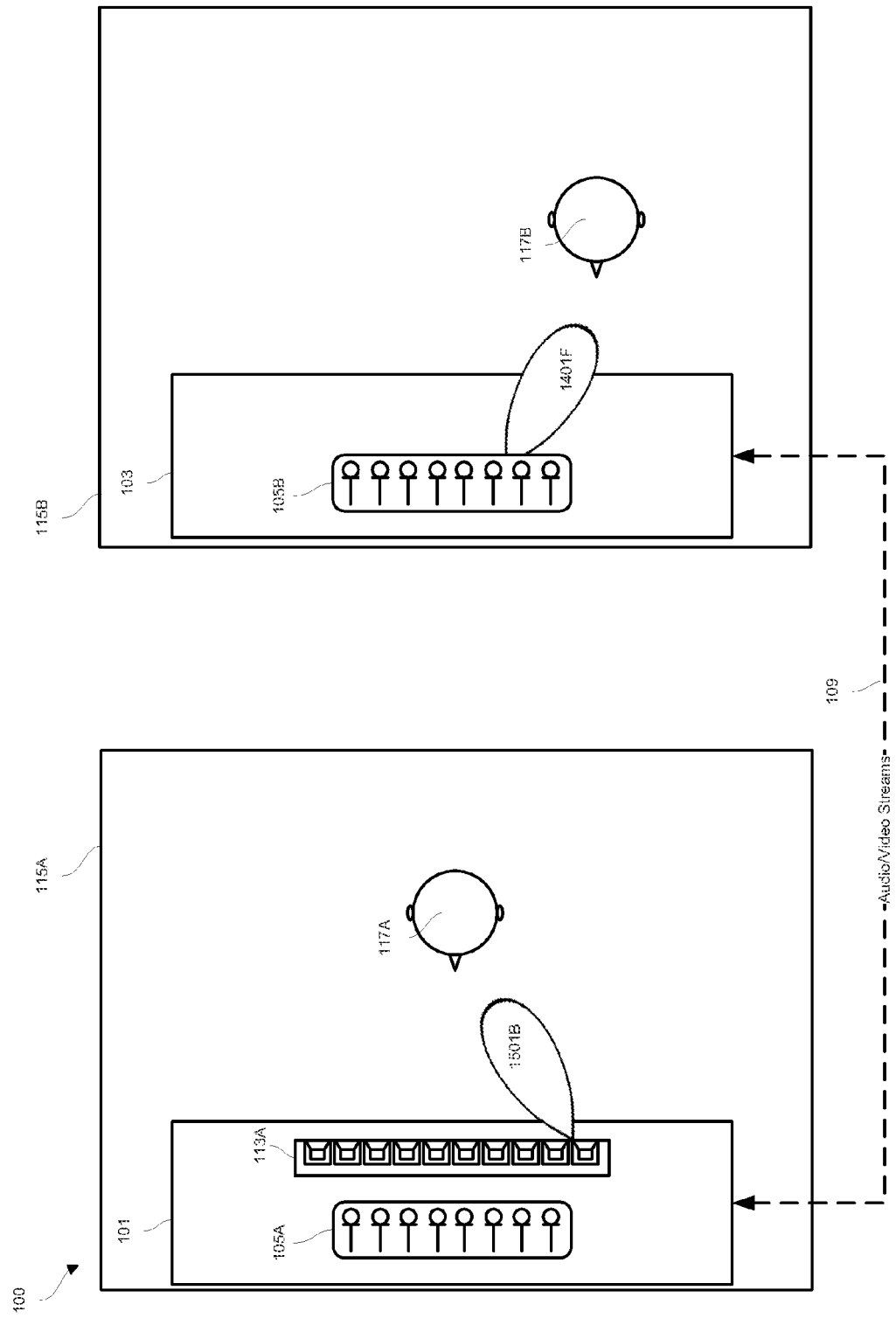
FIG. 15B shows a microphone beam produced by a far-end system and a speaker beam produced by a near-end system in response to the far-end microphone beam according to one embodiment.

In one embodiment, the selection of the microphone beam j by the far-end system 103 may also be passed to the speaker beamformer 701 to select a corresponding speaker beam to accurately represent/image the user 117B in the first location 115A. For example, when the microphone beam 1401D is selected by the far-end system 103, which scans the right side of the second location 115B, the speaker beamformer 701 may select the speaker beam 1501A as shown in FIG. 15A. This selected speaker beam 1501A simulates/images the user 117B to be on the right side of the first location 115A to mimic the position of the user 117B in the second location 115B. In another example, when the microphone beam 1401F is selected by the far-end system 103, which scans the left side of the second location 115B, the speaker beamformer 701 may select the speaker beam 1501B as shown in FIG. 15B. This selected speaker beam 1501B simulates/images the user 117B to be on the left side of the first location 115A to mimic the position of the user 117B in the second location 115B. Accordingly, each of the microphone beams j selected by the far-end system 103 may correspond to a speaker beam that will be used by the near-end system 101. Similarly, each of the microphone beams i selected by the near-end system 101 may correspond to a speaker beam that will be used by the far-end system 103.

Returning to the impulse response selector 1301, upon receipt of data describing a set of selected microphone beams i and j used by the systems 101 and 103, respectively, the impulse response selector 1301 may select a corresponding pre-computed impulse response $H_{i,j}$ from the storage device 1303. The storage device 1303 may be any device that stores a set of impulse responses H. In one embodiment, the storage device 1303 may be any memory device, including microelectronic, non-volatile random access memory, that stores impulse responses H corresponding to each permutation of microphone beams i used by the near-end system 101 and microphone beams j used by the far-end system 103. For instance, in the example configuration shown in FIG. 14 in which the near-end system 101 may select between the microphone beams 1401A-1401C and the far-end system 103 may select between the microphone beams 1401D-1401F, the storage device 1303 may store data describing nine impulse responses H, which correspond to each permutation of selecting one of the microphone beams 1401A-1401C and one of the microphone beams 1401D-1401F.

The impulse response $H_{i,j}$, which was selected based on the microphone beams i and j used by the near-end and far-end systems 101 and 103, respectively, may be passed to an echo canceller 205 for performing echo cancellation on the microphone beam i. As described, the echo cancellation performed by the echo canceller 205 is a mono echo cancellation problem and does not involve the complexity and potential distortions related to stereo echo cancellation. In one embodiment, the impulse responses H may each be represented by a set of vectors that represent the echo path between selected microphone beam i that is being used by the near-end system 101 and the corresponding speaker beam that is selected to be used by the near-end system 101 based on the selected microphone beam j used by the far-end system 103. In one embodiment, each impulse response H may be computed by a corresponding echo canceller 205 at the start of an audio conference between the system 101 and 103. Thereafter, the impulse responses H may be periodically updated by the echo cancellers 205. In one embodiment, a foreground or background echo canceller 205 may be dedicated/assigned by the echo canceller assignor 211 to periodically update the impulse responses H.

Figure 16:
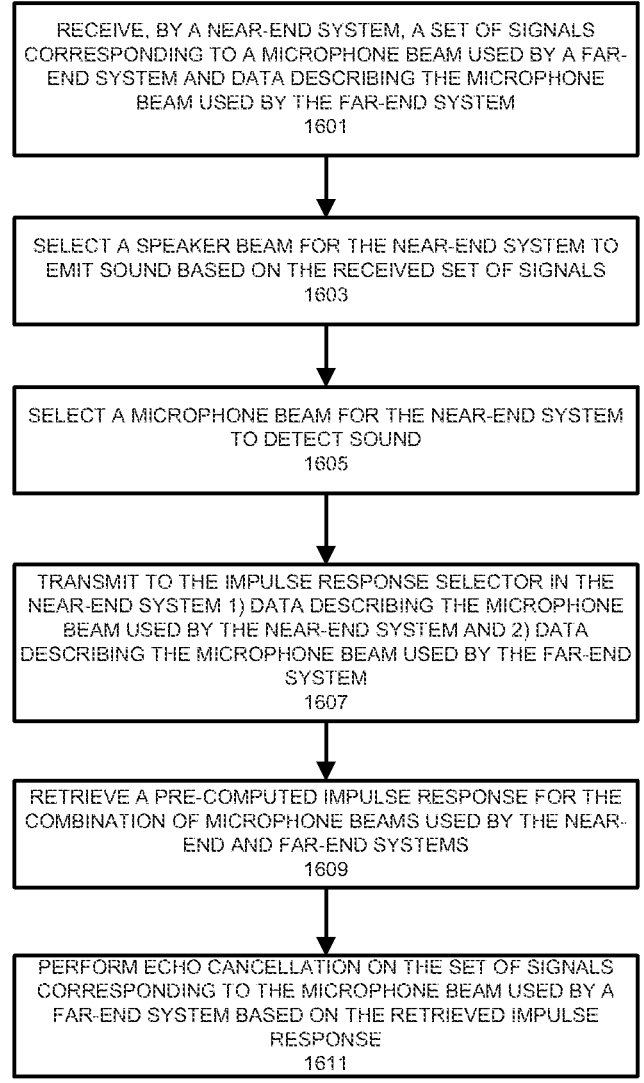
FIG. 16 shows a method for performing echo cancellation during an audio conference between a near-end system and a far-end system according to one embodiment.

Turning now to FIG. 16, a method 1600 for performing echo cancellation during an audio conference between the near-end system 101 and the far-end system 103 will now be described. Each operation of the method 1600 may be performed by one or more components of the near-end system 101 and/or the far-end system 103. Although described in relation to echo cancellation performed by the near-end system 101 based on a microphone beam received from the far-end system 103, the method 1600 may be similarly and/or concurrently performed by the far-end system 103 based on a microphone beam received from the near-end system 101.

The method 1600 may commence at operation 1601 with receipt, by the near-end system 101, of a set of audio signals that represent a microphone beam j used by the far-end system 103 to detect sound in the second location 115B. In one embodiment, at operation 1601 the near-end system 101 may also receive data indicating which microphone beam j the set of audio signals represent. For example, the near-end system 101 may receive a set of audio signals representing microphone beam 1401D shown in FIG. 15A and data indicating that the set of audio signals correspond to the microphone beam 1401D. In one embodiment, the set of audio signals and the data indicating the microphone beam j represented by the set of audio signals may be received by the network interface 202 of the near-end system 101 via the data connection 109 at operation 1601.

At operation 1603, the near-end system 101 may select a speaker beam to output sound corresponding to the received set of audio signals. For example, as shown in FIG. 15A and described above, the near-end system 101 may select the speaker beam 1501A to output audio corresponding to the microphone beam 1401D used by the far-end system 103. The selection of the speaker beam 1501A allows the near-end system 101 to accurately image the sound source represented by the microphone beam 1401D (e.g., the user 117B).

At operation 1605, the method 1600 may determine a microphone beam i to be used by the near-end system 101 to detect sounds in first location 115A. The selection of the microphone beam i may be selected by one or more components of the near-end system 101, including the uplink channel selector 215. In one embodiment, the selection of the microphone beam i may be based on an echo level estimate, a local voice level estimate, and/or a ratio of local-voice-level estimates to echo-level estimates for each microphone beam generated by the near-end system 101. For example, the microphone beam generated by the near-end system 101 with the highest ratio of local-voice-level estimates to echo-level estimates may be selected at operation 1605. By selecting the microphone beam with the highest ratio of local-voice-level to echo-level, the system 101 is most likely using a high interest microphone beam (e.g., a microphone beam that is directly capturing the voice of the user 117A).

Following receipt of data indicating the microphone beam j used by the far-end system 103 at operation 1601 and the microphone beam i used by the near-end system 101 at operation 1605, operation 1607 may transmit both of these pieces of data to the impulse response selector 1301. Upon receipt of data indicating the microphone beams i and j used by the near-end and the far-end systems 101 and 103, respectively, operation 1609 may retrieve a pre-computed impulse response $H_{i,j}$ from the storage device 1303 corresponding to the microphone beams i and j selected at operation 1601 and 1605. In one embodiment, the impulse response $H_{i,j}$ may be represented by a set of vectors that represent the echo path between the selected microphone beam i that is being used by the near-end system 101 and the corresponding speaker beam that is selected to be used by the near-end system 101 based on the selected microphone beam j used by the far-end system 103.

Following retrieval of an impulse response $H_{i,j}$ at operation 1609, operation 1611 may pass the impulse response $H_{i,j}$ to an echo canceller 205 such that echo cancellation may be performed on the microphone beam i. As described, the echo cancellation performed by the echo canceller 205 is a mono echo cancellation problem and does not involve the complexity and potential distortions related to stereo echo cancellation. Accordingly, echo cancellation may be performed for a microphone beam i used by the near-end system 101 while still accurately imaging the far-end user 117B without the need for stereo echo cancellation.

In some embodiments, a method for driving a speaker array to reduce echo picked-up by one or more microphones, may comprise: driving the speaker array with a set of current beam settings to generate a main beam; driving the speaker array with a set of test beam settings to generate a test beam; detecting sound produced by each of the main beam and the test beam using the one or more microphones; comparing echo levels in microphone signals corresponding to the main beam and microphone signals corresponding to the test beam; and setting the current beam settings equal to the test beam settings in response to determining that the microphone signals corresponding to the main beam have higher echo levels than the microphone signals corresponding to the test beam. In some embodiments, the test beam and the main beam are driven using separate audio signals and the test beam and the main beam are concurrently generated by the speaker array. In some embodiments, the test beam and the main beam are generated by the speaker array during distinct time periods and the test beam and the main beam are generated using separate time segments of the same audio signal. In some embodiments, the test beam settings are selected such that the test beam is a panned version of the main beam. In some embodiments, the method further comprises comparing the echo level of the test beam with a predefined echo level in response to determining that the microphone signals corresponding to the main beam have higher echo levels than microphone signals corresponding to the test beam; and generating a new set of test beam settings in response to determining that the echo level of the test beam is above the predefined echo level. In some embodiments, the test beam is driven with pseudo-random orthogonal signals.

In some embodiments, a system for driving a speaker array to reduce echo in microphone signals, may comprise: a speaker beamformer for 1) driving the speaker array with a set of current beam settings to generate a main beam and 2) driving the speaker array with a set of test beam settings to generate a test beam; a plurality of microphones for detecting sound produced by each of the main beam and the test beam using the one or more microphones; and a hardware processor for 1) comparing echo levels in microphone signals corresponding to the main beam and microphone signals corresponding to the test beam and 2) setting the current beam settings equal to the test beam settings in response to determining that the microphone signals corresponding to the main beam have higher echo levels than the microphone signals corresponding to the test beam. In some embodiments, the test beam and the main beam are driven using separate audio signals and the test beam and the main beam are concurrently generated by the speaker array. In some embodiments, the test beam and the main beam are generated by the speaker array during distinct time periods and the test beam and the main beam are generated using separate time segments of the same audio signal. In some embodiments, the test beam settings are selected such that the test beam is a panned version of the main beam. In some embodiments, the hardware processor compares the echo level of the test beam with a predefined echo level in response to determining that the microphone signals corresponding to the main beam have higher echo levels than microphone signals corresponding to the test beam. In some embodiments, the speaker beamformer generates a new set of test beam settings in response to determining that the echo level of the test beam is above the predefined echo level. In some embodiments, the test beam is driven with pseudo-random orthogonal signals.

In some embodiments, a article of manufacture, may comprise: a non-transitory machine-readable storage medium that stores instructions which, when executed by a processor in a computer, generate a set of current beam settings for a main speaker beam; generate a set of test beam settings for a test speaker beam; process microphone signals corresponding to sound generated by the main speaker beam and microphone signals corresponding to sound generated by the test speaker beam; compare echo levels in the microphone signals corresponding to the main speaker beam and the microphone signals corresponding to the test speaker beam; and set the current beam settings equal to the test beam settings in response to determining that the microphone signals corresponding to the main speaker beam have higher echo levels than the microphone signals corresponding to the test speaker beam. In some embodiments, the test speaker beam and the main speaker beam are driven using separate audio signals and the test speaker beam and the main speaker beam are concurrently generated by a speaker array. In some embodiments, the test speaker beam and the main speaker beam are output by a speaker array during distinct time periods and the test speaker beam and the main speaker beam are output by the speaker array using separate time segments of the same audio signal. In some embodiments, the non-transitory machine-readable storage medium stores further instructions which, when executed by the processor: compare the echo level of the test speaker beam with a predefined echo level in response to determining that the microphone signals corresponding to the main speaker beam have higher echo levels than the microphone signals corresponding to the test speaker beam; and generate a new set of test beam settings in response to determining that the echo level of the test speaker beam is above the predefined echo level. In some embodiments, the test speaker beam is driven with pseudo random orthogonal signals.

In some embodiments, a method for reducing echo in a microphone signal, may comprise: determining a near-end microphone beam used by a near-end system to capture sound; receiving, by the near-end system from a far-end system, 1) data describing a far-end microphone beam used by the far-end system to capture sound and 2) far-end microphone signals representing the sound captured by the far-end microphone beam; determining, based on the far-end microphone beam, a speaker beam for the near-end system to use for playing the far-end microphone signals; selecting an impulse response estimate based on the near-end microphone beam and the near-end microphone beam; and performing echo cancellation on the near-end microphone signals based on the selected impulse response. In some embodiments, the near-end microphone beam is selected from a set of near-end microphone beams produced by the near-end system and the far-end microphone beam is selected from a set of far-end microphone beams produced by the far end system. In some embodiments, the method may further comprise storing an impulse response estimate for each pair of 1) near-end microphone beam in the set of near-end microphone beams and 2) far-end microphone beam in the set of far-end microphone beams. In some embodiments, the near-end system selects the near-end microphone beam based on echo-level estimates for the set of near-end microphone beams produced by the near-end system. In some embodiments, the selected impulse response estimate is pre-computed prior to receiving the data describing the far-end microphone beam and the far-end microphone signals. In some embodiments, the method may further comprise updating the selected impulse response estimate based on performance of echo cancellation on the near-end microphone signals. In some embodiments, the selected impulse response estimate describes the echo path between the speaker beam produced by a speaker array of the near-end system and the near-end microphone beam produced by a microphone array of the near-end system. In some embodiments, the speaker beam is selected from a set of speakers beams produced by the near-end system and each speaker beam in the set of speaker beams is associated with one far-end microphone beam in the set of far-end microphone beams such that each selected speaker beam in the set of speaker beams accurately images sounds captured by an associated far-end microphone beam.

In some embodiments, a system for reducing echo in a microphone signal, may comprise: an uplink channel selector for selecting a near-end microphone signal to transmit to a far-end system, wherein the near-end microphone signal represents sound captured by the near-end system; a network interface for receiving, from the far-end system, 1) data describing a far-end microphone beam used by the far-end system to capture sound and 2) far-end microphone signals representing the sound captured by the far-end microphone beam; a speaker beamformer for determining, based on the far-end microphone beam, a speaker beam for the near-end system to use for playing the far-end microphone signals; an impulse response selector for selecting an impulse response estimate based on the near-end microphone beam and the near-end microphone beam; and an echo canceller for performing echo cancellation on the near-end microphone signals based on the selected impulse response. In some embodiments, the near-end microphone beam is selected from a set of near-end microphone beams produced by the near-end system and the far-end microphone beam is selected from a set of far-end microphone beams produced by the far end system. In some embodiments, the system may further comprise a storage unit for storing an impulse response estimate for each pair of 1) near-end microphone beam in the set of near-end microphone beams and 2) far-end microphone beam in the set of far-end microphone beams. In some embodiments, the near-end system selects the near-end microphone beam based on echo-level estimates for the set of near-end microphone beams produced by the near-end system. In some embodiments, the selected impulse response estimate is pre-computed prior to receiving the data describing the far-end microphone beam and the far-end microphone signals. In some embodiments, the echo canceller updates the selected impulse response estimate based on performance of echo cancellation on the near-end microphone signals. In some embodiments, the selected impulse response estimate describes the echo path between the speaker beam produced by a speaker array of the near-end system and the near-end microphone beam produced by a microphone array of the near-end system. In some embodiments, the speaker beam is selected from a set of speaker beams produced by the near-end system and each speaker beam in the set of speaker beams is associated with one far-end microphone beam in the set of far-end microphone beams such that each selected speaker beam in the set of speaker beams accurately image sounds captured by an associated far-end microphone beam.

In some embodiments, an article of manufacture, may comprise: a non-transitory machine-readable storage medium that stores instructions which, when executed by a processor in a computer, determine a near-end microphone beam used by a near-end system to capture sound; process, by the near-end system, 1) data describing a far-end microphone beam used by a far-end system to capture sound and 2) far-end microphone signals representing the sound captured by the far-end microphone beam; determine, based on the far-end microphone beam, a speaker beam for the near-end system to use for playing the far-end microphone signals; select an impulse response estimate based on the near-end microphone beam and the near-end microphone beam; and perform echo cancellation on the near-end microphone signals based on the selected impulse response. In some embodiments, the near-end microphone beam is selected from a set of near-end microphone beams produced by the near-end system and the far-end microphone beam is selected from a set of far-end microphone beams produced by the far end system. In some embodiments, the non-transitory machine-readable storage medium stores further instructions which, when executed by the processor: store an impulse response estimate for each pair of 1) near-end microphone beam in the set of near-end microphone beams and 2) far-end microphone beam in the set of far-end microphone beams. In some embodiments, the near-end system selects the near-end microphone beam based on echo-level estimates for the set of near-end microphone beams produced by the near-end system. In some embodiments, the selected impulse response estimate is pre-computed prior to receiving the data describing the far-end microphone beam and the far-end microphone signals. In some embodiments, the non-transitory machine-readable storage medium stores further instructions which, when executed by the processor: update the selected impulse response estimate based on performance of echo cancellation on the near-end microphone signals. In some embodiments, the selected impulse response estimate describes the echo path between the speaker beam produced by a speaker array of the near-end system and the near-end microphone beam produced by a microphone array of the near-end system. In some embodiments, the speaker beam is selected from a set of speakers beams produced by the near-end system and each speaker beam in the set of speaker beams is associated with one far-end microphone beam in the set of far-end microphone beams such that each selected speaker beam in the set of speaker beams accurately image sounds captured by an associated far-end microphone beam.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A system for performing echo control, comprising:
   a plurality of microphones to generate microphone signals based on detected sounds in a listening area;
   a beamformer for generating a plurality of microphone beams based on the generated microphone signals;
   a plurality of echo cancellers for reducing echo picked-up by corresponding assigned microphone beams;
   a beam selector for selecting one or more of the plurality of microphone beams as candidate microphone beams based on statistics associated with each of the microphone beams; and
   a beam assignor for assigning the candidate microphone beams to the plurality of echo cancellers based on the statistics associated with each of the candidate microphone beams.

2. The system of claim 1, further comprising:
   an uplink selector for selecting one or more echo cancelled candidate microphone beams from the plurality of echo cancellers for uplink to a far-end system based on the statistics associated with each of the echo cancelled candidate microphone beams.

3. The system of claim 2, further comprising:
   a non-linear echo suppressor, distinct from the plurality of echo cancellers, for suppressing echo on the one or more echo cancelled candidate microphone beams selected by the uplink selector.

4. The system of claim 2, wherein the uplink selector selects an echo cancelled candidate microphone beam for uplink to the far-end system when 1) the echo canceller for the echo cancelled candidate microphone beam has adapted or 2) an echo-level estimate for each of the candidate microphone beams being processed by the echo cancellers is below a predefined echo threshold.

5. The system of claim 2, wherein the uplink selector selects an echo cancelled candidate microphone beam for uplink to the far-end system when a local voice to echo ratio for the echo cancelled candidate microphone beam exceeds a predefined local voice to echo threshold.

6. The system of claim 2, wherein the plurality of echo cancellers include 1) one or more partial mode echo cancellers, wherein the partial mode echo cancellers generate statistics for corresponding microphone beams using a first set of echo operations and 2) one or more full mode echo cancellers, wherein the full mode echo cancellers perform echo cancellation for corresponding microphone beams using a second set of operations, wherein the first set of operations are a subset of the second set of operations.

7. The system of claim 6, wherein the statistics generated by the one or more partial mode echo cancellers are used by the beam selector for selecting one or more microphone beams as candidate microphone beams and wherein the statistics generated by the full mode echo cancellers are used by the uplink selector for selecting one or more of the microphone beams for uplink to the far-end system.

8. The system of claim 1, further comprising:
   a plurality of statistics generators for generating the statistics associated with each of the microphone beams, wherein the statistics generators take information from the echo cancellers, and wherein each of the statistics generators may be included fully or partially in the same unit as an echo canceller from the plurality of echo cancellers, and wherein the statistics generated by the statistics generators include one or more of 1) an echo-level estimate for a corresponding microphone beam, 2) a local-voice-level estimate for a corresponding microphone beam, 3) a ratio of the local-voice-level estimate to the echo-level estimate for a corresponding microphone beam, and 4) a determination on convergence of an echo canceller associated with a corresponding microphone beam.

9. The system of claim 8, wherein the microphone beams from the plurality of microphones with higher values of local-voice-level estimates and higher ratios of local-voice-level estimates to echo-level estimates are selected by the beam selector as candidate microphone beams.

10. A method for performing echo control, comprising:
    generating a plurality of microphone signals based on sound detected in a listening area;
    generating a plurality of microphone beams based on the generated microphone signals;
    selecting one or more of the plurality of microphone beams as candidate microphone beams based on statistics associated with each of the microphone beams;
    assigning the candidate microphone beams to a plurality of echo cancellers based on the statistics associated with each of the candidate microphone beams; and
    performing echo cancellation by the echo cancellers for corresponding assigned candidate microphone beams.

11. The method of claim 10, further comprising:
    selecting one or more echo cancelled candidate microphone beams from the plurality of echo cancellers for uplink to a far-end system based on the statistics associated with each of the echo cancelled candidate microphone beams.

12. The method of claim 11, wherein the assignment of the candidate microphone beams to a plurality of echo cancellers includes 1) the assignment of one or more microphone beams to partial mode echo cancellers in the plurality of echo cancellers, wherein the partial mode echo cancellers generate statistics for corresponding microphone beams without performing echo cancellation and 2) the assignment of one or more microphone beams to full mode echo cancellers in the plurality of echo cancellers, wherein the full mode echo cancellers perform echo cancellation and generate statistics for corresponding microphone beams.

13. The method of claim 12, wherein the statistics generated by the partial mode echo cancellers are used for selecting one or more microphone beams as candidate microphone beams and wherein the statistics generated by the full mode echo cancellers are used for selecting one or more of the microphone beams for uplink to the far-end system.

14. The method of claim 11, wherein an echo cancelled candidate microphone beam is selected for uplink to the far-end system when 1) the echo canceller for the echo cancelled candidate microphone beam has adapted or 2) the echo-level estimate for each of the candidate microphone beams being processed by the echo cancellers is below a predefined echo threshold.

15. The method of claim 11, wherein an echo cancelled candidate microphone beam is selected for uplink to the far-end system when a local voice to echo ratio for the echo cancelled candidate microphone beam exceeds a predefined local voice to echo threshold.

16. The method of claim 10, further comprising:
generating the statistics associated with each of the microphone beams, wherein the statistics are generated by statistics generators based on information from the echo cancellers or echo suppressors, and wherein each of the statistics generators may be included fully or partially in the same unit as an echo canceller from the plurality of echo cancellers, and wherein the statistics include one or more of 1) an echo-level estimate for a corresponding microphone beam, 2) a local-voice-level estimate for a corresponding microphone beam, 3) a ratio of the local-voice-level estimate to the echo-level estimate for a corresponding microphone beam, and 4) a determination on convergence of an echo canceller associated with a corresponding microphone beam.

17. The method of claim 16, wherein the microphone beams with higher values of local-voice-level estimates and higher ratios of local-voice-level estimates to echo-level estimates are selected as candidate microphone beams.

18. An article of manufacture, comprising:
a non-transitory machine-readable storage medium that stores instructions which, when executed by a processor in a computer,
generate a plurality of microphone signals based on sound detected in a listening area;
generate a plurality of microphone beams based on the generated microphone signals; select one or more of the plurality of microphone beams as candidate microphone beams based on statistics associated with each of the microphone beams;
assign the candidate microphone beams to a plurality of echo cancellers based on the statistics associated with each of the candidate microphone beams; and
perform echo cancellation by the echo cancellers for corresponding assigned candidate microphone beams.

19. The article of manufacture of claim 18, wherein the non-transitory machine-readable storage medium stores further instructions which, when executed by the processor:
select one or more echo cancelled candidate microphone beams from the plurality of echo cancellers for uplink to a far-end system based on the statistics associated with each of the echo cancelled candidate microphone beams.

20. The article of manufacture of claim 19, wherein the non-transitory machine-readable storage medium stores further instructions which, when executed by the processor:
perform echo suppression on the selected one or more echo cancelled candidate microphone beams to suppress non-linear echo.

* * * * *